(12) United States Patent
Repasi et al.

(10) Patent No.: US 7,801,840 B2
(45) Date of Patent: Sep. 21, 2010

(54) THREAT IDENTIFICATION UTILIZING FUZZY LOGIC ANALYSIS

(75) Inventors: Rolf Repasi, Sunrise Beach (AU);
Simon Clausen, New South Wales (AU);
Ian Oliver, New South Wales (AU);
Ryan Pereira, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 692 days.

(21) Appl. No.: 11/829,592

(22) Filed: Jul. 27, 2007

(65) Prior Publication Data

US 2008/0027891 A1    Jan. 31, 2008

Related U.S. Application Data

(60) Provisional application No. 60/834,109, filed on Jul. 28, 2006.

(51) Int. Cl.
*G08B 23/00* (2006.01)
*G06F 21/00* (2006.01)
*G06F 15/18* (2006.01)

(52) U.S. Cl. .............................. 706/52; 726/22; 726/24

(58) Field of Classification Search .................. 706/52; 726/24
See application file for complete search history.

(56) References Cited

U.S. PATENT DOCUMENTS 6,973,577 B1    12/2005    Kouznetsov

OTHER PUBLICATIONS

Jonathan Gomez, Fabio Gonzalez, Dipankar Dasgupta, "An Immuno-Fuzzy Approach to Anomaly Detection" The IEEE International Conference on Fuzzy Systems, 2003, pp. 1219-1224.*

* cited by examiner

*Primary Examiner*—Donald Sparks
*Assistant Examiner*—Ola Olude Afolabi
(74) *Attorney, Agent, or Firm*—Holland & Hart

(57) ABSTRACT

A method, system, computer program product, and/or computer readable medium of instructions for identifying a malicious entity in a processing system, comprising determining an entity threat value for an entity, the entity threat value being indicative of a level of threat that the entity represents to the processing system, wherein the entity threat value is determined based on one or more characteristics of the entity; and compare the entity threat value to an entity threat threshold to identify if the entity is malicious. In another form, there is provided a method, system, computer program product, and/ or computer readable medium of instructions for identifying a malicious entity in a processing system, comprising determining one or more input values indicative of an entity; and performing a fuzzy logic analysis in relation to the one or more input values to identify if the entity is malicious.

20 Claims, 16 Drawing Sheets

THREAT IDENTIFICATION UTILIZING FUZZY LOGIC ANALYSIS

This application claims the benefit of priority from U.S. Provisional Patent Application No. 60/834,109 filed Jul. 28, 2006, and is incorporated by reference.

TECHNICAL FIELD

The present invention generally relates to a method, system and/or computer readable medium of instructions for identifying a threat in processing system. In one form, the present invention relates to determining a malicious threat associated with a malicious entity in a processing system.

BACKGROUND ART

As used herein a "threat" comprises malicious software, also known as "malware" or "pestware", which comprises software that is included or inserted in a part of a processing system for a harmful purpose. The term threat should be read to comprise possible, potential and actual threats. Types of malware can comprise, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may comprise or be associated with other devices, for example a local data storage device such as a hard disk drive or solid state drive.

An information source can comprise a server, or any type of terminal, that may be associated with one or more storage devices that are able to store information or data, for example in one or more databases residing on a storage device. The exchange of information (ie. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

An entity can comprise, but is not limited to, a file, an object, a class, a collection of grouped data, a library, a variable, a process, and/or a device.

A problem faced by the computer system industry is how to identify a malicious entity in a processing system. Traditional methods comprise using a dictionary containing signatures of malicious entities which can be used to determine if an entity in a processing system is malicious.

However, due to malware changing rapidly as new versions or modifications of malware infect processing systems, dictionaries need to be continually updated in order to determine which entities are malicious. When modified or new versions of malware infect a processing system which the dictionary is not configured to identify, it is difficult identify a malicious entity in the processing system.

Therefore, there exists a need for a method, system and/or computer readable medium of instructions to identify a malicious entity in a processing system which addresses or at least ameliorates one or more problems inherent in the prior art.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In one broad form there is provided a method of identifying a malicious entity in a processing system, wherein the method comprises:

determining an entity threat value for an entity, the entity threat value being indicative of a level of threat that the entity represents to the processing system, wherein the entity threat value is determined based on one or more characteristics of the entity; and comparing the entity threat value to an entity threat threshold to identify if the entity is malicious.

In one particular, but non-limiting, form, each of the one or more characteristics of the entity is associated with a respective characteristic threat value, wherein the method comprises calculating the entity threat value using at least some of the characteristic threat values for the one or more characteristics of the entity.

In another particular, but non-limiting, form, at least one of the one or more characteristics of the entity is associated with a characteristic threat value formula, wherein the method comprises calculating, using the characteristic threat value formula, the characteristic threat value.

In one embodiment, at least one characteristic threat value is temporally dependent, wherein the method comprises calculating the at least one characteristic threat value for the entity using the characteristic threat value formula and a temporal value.

In one form, the at least one characteristic is a behaviour associated with the entity, wherein the method comprises calculating the at least one characteristic threat value for the entity using the characteristic threat value formula and a frequency of instances the behaviour has been performed.

In another embodiment, the one or more characteristics comprises at least one of one or more legitimate characteristics indicative of non-malicious activity and one or more illegitimate characteristics indicative of malicious activity, wherein the method comprises determining the entity threat value using characteristic threat values associated with at least one of the one or more legitimate characteristics and/or the one or more illegitimate characteristics of the entity.

In one optional form, determining the entity threat value for an entity comprises calculating a difference between the characteristic threat values for the one or more legitimate characteristics of the entity, and the characteristic threat values for the one or more illegitimate characteristics of the entity, wherein the difference is indicative of the entity threat value.

In another optional form, the method comprises:

determining one or more related entities to the entity, wherein each related entity has an associated entity threat value; and, calculating the entity threat value for the entity using the entity threat value for at least some of the one or more related entities.

In another optional form, the method comprises:

determining one or more related entities to the entity, wherein each related entity has an associated entity threat value; and, calculating a group threat value for the entity and one or more related entities using the entity threat value for at least some of the one or more related entities and the entity.

Optionally, the method comprises weighting the entity threat value for at least one related entity according to the relatedness of the at least one related entity relative to the entity.

Optionally, the method comprises weighting the entity threat value for the entity according to permissions of the entity.

In a second broad form there is provided a system to identify a malicious entity in a processing system, wherein the system is configured to:

determine an entity threat value for an entity, the entity threat value being indicative of a level of threat that the entity represents to the processing system, wherein the entity threat value is determined based on one or more characteristics of the entity; and compare the entity threat value to an entity threat threshold to identify if the entity is malicious.

In a third broad form there is provided a system to identify a malicious entity in a processing system, wherein the system is configured to:

determine one or more input values indicative of one or more characteristics of an entity; and perform a fuzzy logic analysis in relation to the one or more input values to identify if the entity is malicious.

In optional forms, the system is configured to determine an action to perform in regard to whether the entity is determined to be malicious.

In another optional form, the one or more input values can comprise at least one of: an entity threat value;

a group threat value;
a frequency of an event occurring;
a number of related entities to the entity; and
a number of child processes created by the entity.

In a fourth broad form there is provided a method for identifying a malicious entity in a processing system, wherein the method comprises:

determining one or more input values indicative of an entity; and performing a fuzzy logic analysis in relation to the one or more input values to identify if the entity is malicious.

In a fifth broad form there is provided a computer program product comprising a computer readable medium having a computer program recorded therein or thereon, the computer program enabling identification of a malicious entity in a processing system, wherein the computer program product configures the processing system to:

determine an entity threat value for an entity, the entity threat value being indicative of a level of threat that the entity represents to the processing system, wherein the entity threat value is determined based on one or more characteristics of the entity; and compare the entity threat value to an entity threat threshold to identify if the entity is malicious.

In a sixth broad form there is provided a computer program product comprising a computer readable medium having a computer program recorded therein or thereon, the computer program enabling identification of a malicious entity in a processing system, wherein the computer program product configures the processing system to:

determine one or more input values indicative of one or more characteristics of an entity; and perform a fuzzy logic analysis in relation to the one or more input values to identify if the entity is malicious.

According to another broad form, the present invention provides a computer readable medium of instructions for giving effect to any of the aforementioned methods or systems. In one particular, but non-limiting, form, the computer readable medium of instructions are embodied as a software program.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
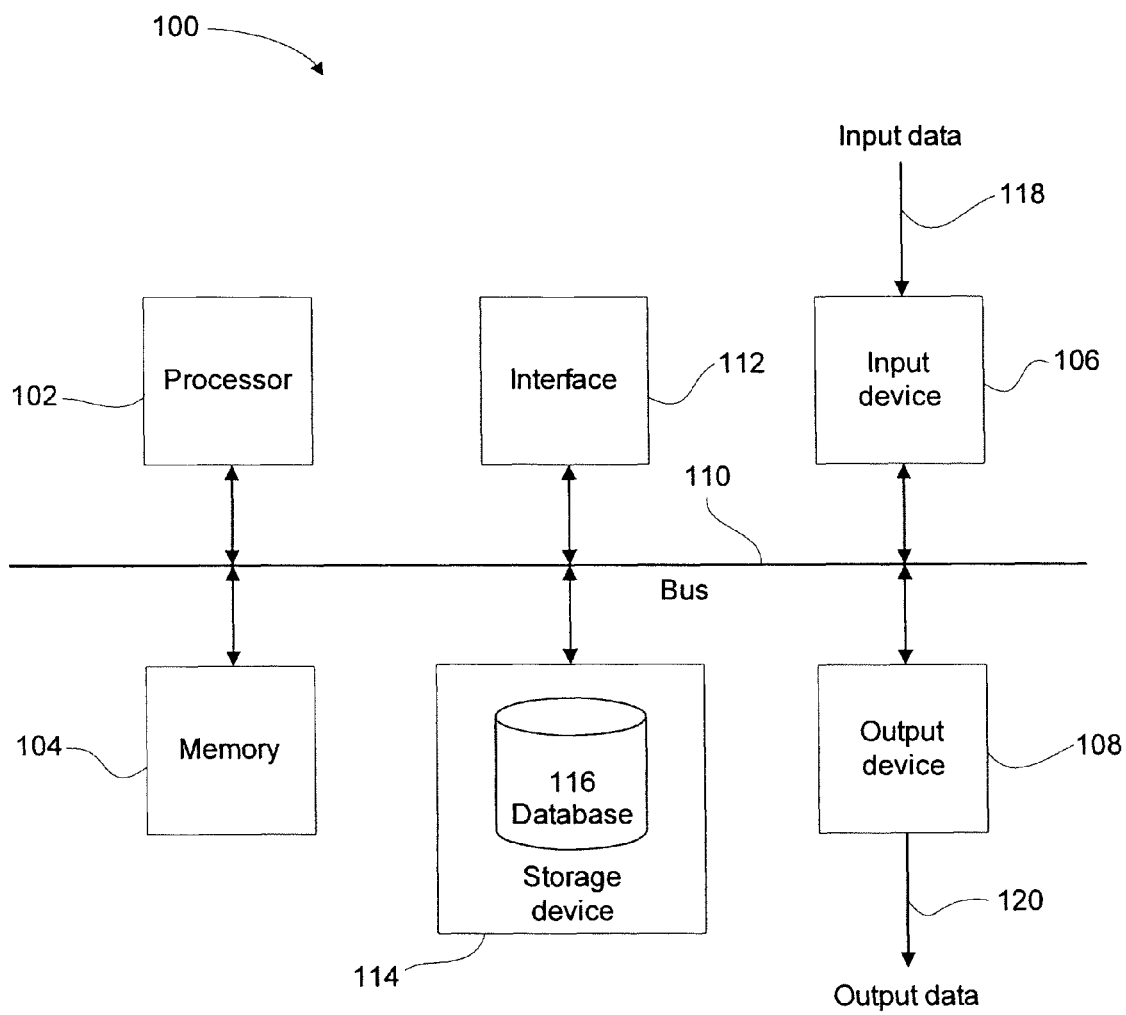
FIG. 1 illustrates a functional block diagram of an example of a processing system that can be utilised to embody or give effect to a particular embodiment.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

A particular embodiment of the present invention can be realised using a processing system, an example of which is shown in FIG. 1.

In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 can be adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server processing system, specialised hardware, or the like.

The processing system 100 may be a part of a networked communications system. The processing system 100 could connect to network, for example the Internet or a WAN. Input data 118 and output data 120 could be communicated to other devices via the network. The transfer of information and/or data over the network can be achieved using wired communications means or wireless communications means. The server can facilitate the transfer of data between the network and one or more databases. The server and one or more databases provide an example of an information source.

Figure 2A:
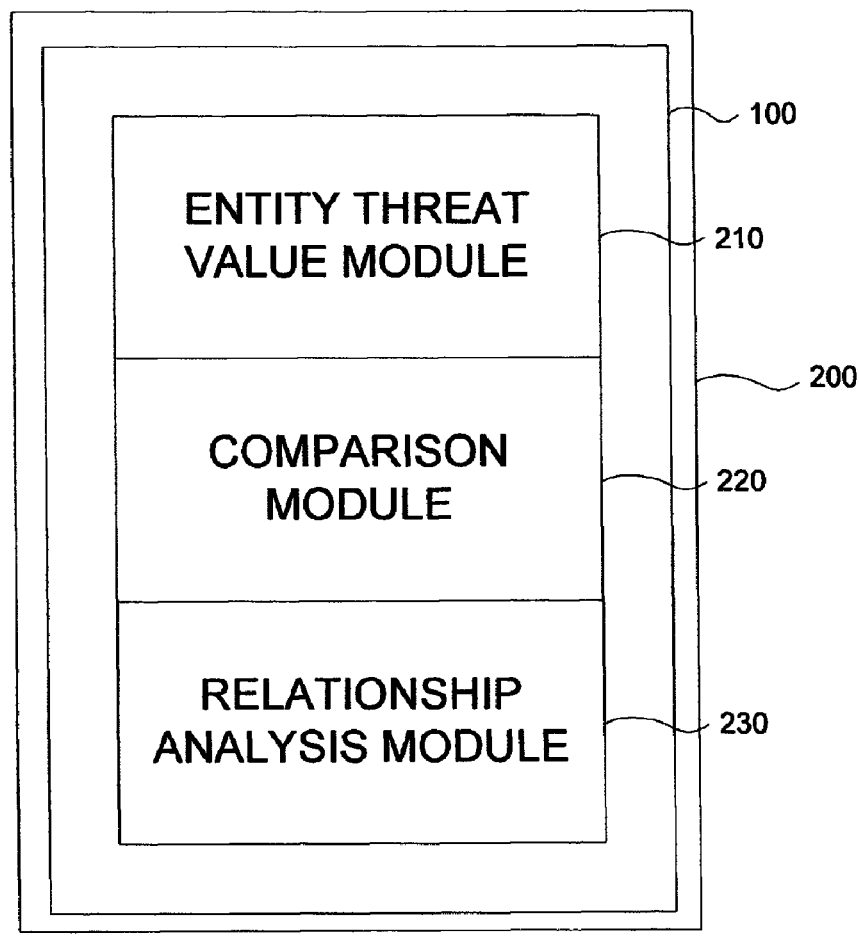
FIG. 2A illustrates a block diagram illustrating an example system to identify a malicious entity.

Referring to FIG. 2A, there is shown a block diagram representing an example of a system 200 to identify a malicious entity 299.

In particular, the system 200 comprises a processing system 100 having an entity threat value module 210 configured to determine an entity threat value (ETV) 290 for an entity 500. The ETV 290 is indicative of a level of threat that the entity 500 represents to the processing system 100. The ETV 290 is determined based on one or more characteristics 250 of the entity 500. The processing system 100 comprises a comparison module 220 configured to compare the ETV 290 to an entity threat threshold (ETT) 225 to identify if the entity 500 is a malicious entity 299.

In optional forms, the processing system 100 can comprise a relationship analysis module 230 configured to determine related entities 560, as will be explained in further detail below. A detailed explanation of detecting related one or more related entities is described in the Applicant's co-pending U.S. patent application Ser. No. 11/707,425 and co-pending Australian Patent application AU2007200605 entitled "Determination of related entities", the content of which is herein incorporated by cross-reference.

By identifying malicious entities 299 by calculating a level of threat based on characteristics 250 of entities 500 in, or in communication with, the processing system 100, new or modified malicious entities 299 can be identified.

Figure 2B:
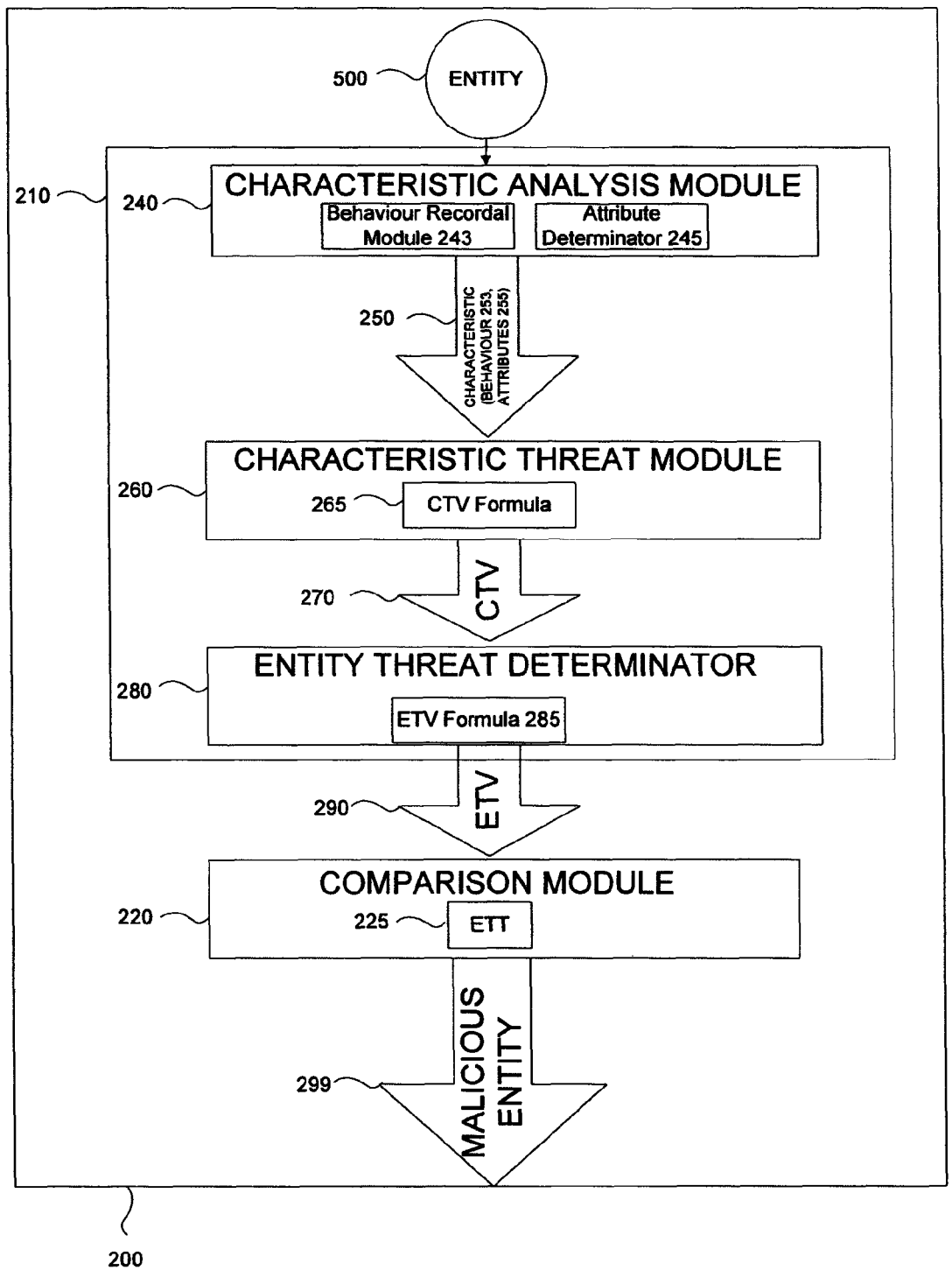
FIG. 2B illustrates a more detailed block diagram of the example system of FIG. 2A.

Referring now to FIG. 2B, there is shown a block diagram illustrating a more detailed example of a system 200 to identify a malicious entity 299.

In particular, an entity 500 is passed to the entity threat value module 210. The entity threat value module 210 can comprise a characteristic analysis module 240 which is configured to determine characteristics 250 of the entity 500. The characteristic analysis module 240 can query a behaviour recordal module 243 and/or an attribute determinator 245 in order to determine characteristics 250 of the entity 500.

The characteristics 250 of the entity 500 are then transferred to a characteristic threat module 260 of the entity threat module 210. The characteristic threat module 260 is configured to determine a characteristic threat value (CTV) 270 for at least some of the characteristics 250 using a CTV formula 265.

The characteristic threat module then transfers one or more CTVs to an entity threat determinator 280 of the entity threat module 210. The entity threat determinator 210 comprises an ETV formula 285. The entity threat determinator 280 can use the ETV formula 285 to determine the ETV 290 for the entity 500.

The entity threat module 210 then transfers the ETV 290 to the comparison module 220 to determine whether the entity 500 is a malicious entity 299. The comparison module 220 comprises an entity threat threshold (ETT) which is used in comparisons of the ETV 290 to determine whether the entity 500 is a malicious entity 299.

Figure 3:
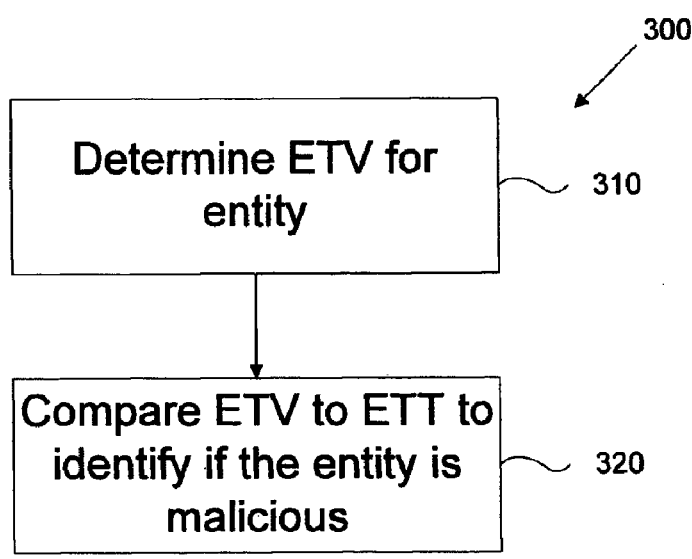
FIG. 3 illustrates a flow diagram representing an example method of identifying a malicious entity.

Referring to FIG. 3, there is shown an example method 300 to detect malicious entities 299.

In particular, at step 310, the method 300 comprises determining the ETV 290 for the entity 500 based on the one or more characteristics 250 of the entity 500. The characteristics 250 of the entity 500 can comprise, but are not limited to, behaviour 253 of the entity 500 and/or attributes 255 of the entity 500. At step 320, the method 300 comprises comparing the ETV 290 to the ETT 225 to identify if the entity 500 is a malicious entity 299.

Figure 4:
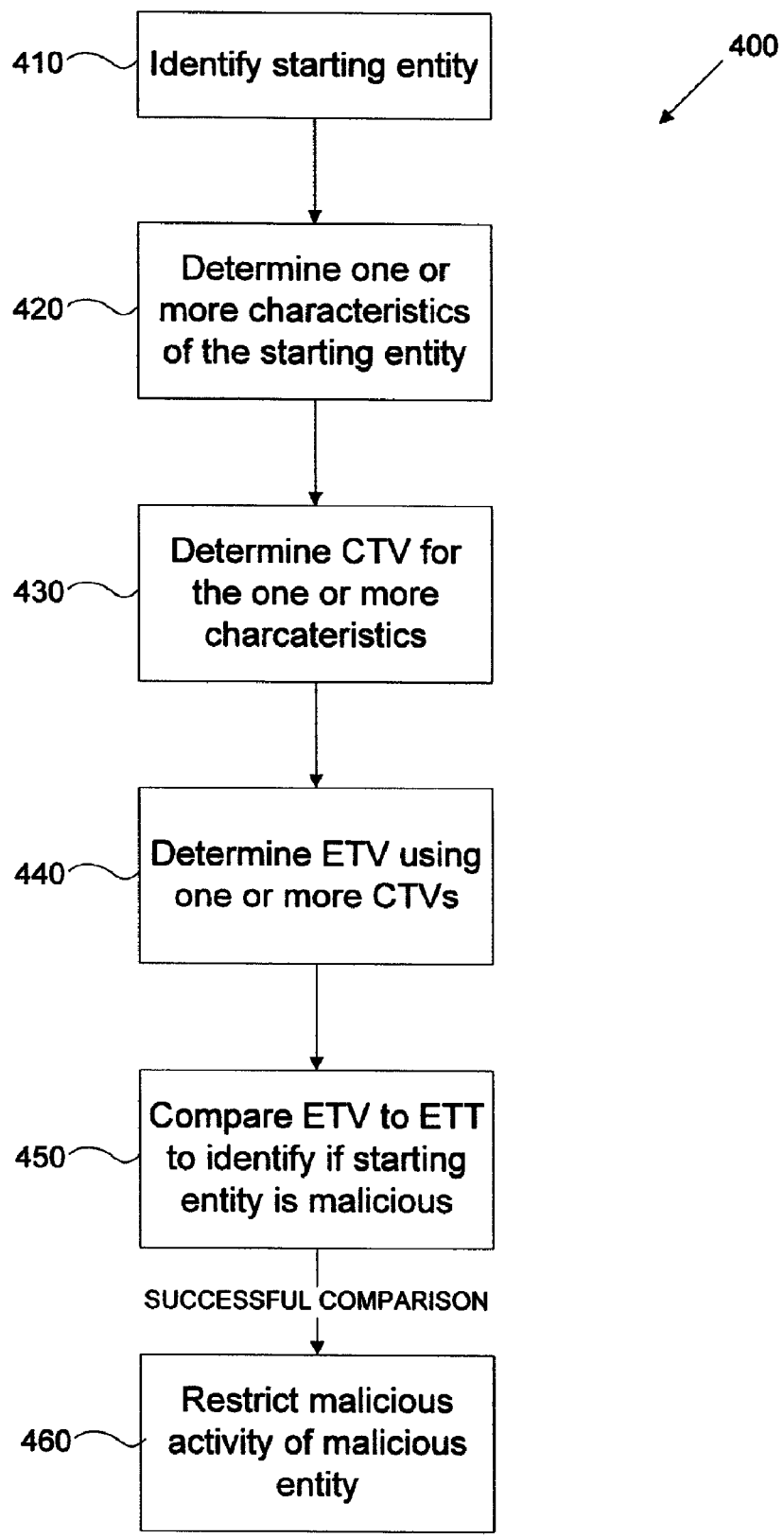
FIG. 4 illustrates a more detailed flow diagram illustrating the example method of FIG. 3.

Referring now to FIG. 4, there is shown a more detailed example of the method of FIG. 3.

In particular, at step 410, the method 400 comprises identifying a starting entity 500 in the processing system 100. The term "starting entity" is used to denote the entity which is being assessed.

The step of identifying a starting entity 500 may comprise selecting a starting entity 500 using one or more starting entity rules.

A non-exhaustive list of examples of starting entity rules may comprise:

- if a particular entity was created or modified within the one or more processing systems within a selected period of time, then the particular entity is determined as being the starting entity 500;
- if a particular entity creates or modifies an entity within one or more processing systems within a selected period of time, then the particular entity is determined as being the starting entity 500;
- if a particular entity was activated within the one or more processing systems within a selected period of time, then the particular entity is determined as being the starting entity 500;
- if a particular entity was downloaded from one or more network addresses, a network address range and/or network address name within the one or more processing systems, then the particular entity is determined as being the starting entity 500;
- if a particular entity was triggered in an automatic manner by a trigger mechanism in the processing systems such as a runkey within the one or more processing systems, then the particular entity is determined as being the starting entity 500;
- if a particular entity was created by another process within the one or more processing systems, then the particular entity is determined as being the starting entity 500;
- if a particular entity was downloaded by a process with a file size in a certain range, then the particular entity is determined as being the starting entity 500;
- if a particular entity was downloaded by a process which has a suspicious pattern of download activity, then the particular entity is determined as being the starting entity 500;
- if a particular entity creates a process, run key, executable, windows instance, cookie, BHO, TOOLBAR, module, link, and or favorite link, then the particular entity is determined as being the starting entity 500;
- if a particular entity creates a process, run key, executable, windows instance, cookie, BHO, TOOLBAR, module, link, favorite link, then the particular entity is determined as being the starting entity 500;
- if a particular entity creates a number of windows instances in quick succession, then the particular entity is determined as being the starting entity 500;
- if a particular entity attempts to hide itself, then the particular entity is determined as being the starting entity 500;
- if a particular entity attempts to create a number of copies of itself, then the particular entity is determined as being the starting entity 500;
- if a particular entity attempts to create random named or sized entities, then the particular entity is determined as being the starting entity 500;
- if a particular entity attempts to create random and fixed section entities, then the particular entity is determined as being the starting entity 500;
- if a particular entity is polymorphic, then the particular entity is determined as being the starting entity 500;
- if a particular entity accesses the a processing system network, such as the Internet/tcpip, for the first time on this processing system, then the particular entity is determined as being the starting entity 500;
- if a particular entity downloads executables, then the particular entity is determined as being the starting entity 500;
- if a particular entity sends email, IRC or any messages using TCP/IP, then the particular entity is determined as being the starting entity 500;
- if a particular entity matches an entity in a database comprising records of malicious entities, then the particular entity is determined as being the starting entity 500;
- if the particular entity contains instructions, functions and/or dynamic linked libraries that contain instructions and or functions that are characteristic of malware, then the particular entity is determined as being the starting entity 500;
- if a particular entity contains strings that correspond to executable filenames, trigger entity names, network address or network address range or network address name, class identities or GUIDS, then the particular entity is determined as being the starting entity 500;
- if a particular entity has no vendor name, then the particular entity is determined as being the starting entity 500;
- if a particular entity has an embedded script or executable, then the particular entity is determined as being the starting entity 500;
- if a particular entity is a class identity, shortcut link on a desktop of a processing system, trigger entity, network address or network address range or network address name, BHO or toolbar, executable, module, favorite, cookies, INF file, archive, then the particular entity is determined as being the starting entity 500;
- if a particular entity is in a section of the processing system where malicious entities tend to exist, then the particular entity is determined as being the starting entity 500;
- if a particular entity has an internal file signature which varies from the extension type of the particular entity, then the particular entity is determined as being the starting entity 500;
- if a particular entity has a file size which is indicative that it may be a malicious entity, then the particular entity is determined as being the starting entity 500;
- if a particular entity comprises a hidden entity property, the particular entity is determined as being the starting entity 500;
- if a particular entity has a name which fails to appear in a white-list, the particular entity is determined as being the starting entity 500;
- if a particular entity has a particular MD5 hash value which fails to appear in a white-list, the particular entity is determined as being the starting entity 500;
- if a particular entity has a name which comprises Unicode, the particular entity is determined as the starting entity 500;
- if a particular entity has a name which comprises a selected keyword, the particular entity is determined as the starting entity 500;
- if a particular entity is located in a selected location in the processing system, the particular entity is determined as the starting entity 500;
- if a particular entity performs an event which creates an executable file on disk, the particular entity is determined as the starting entity 500; and
- if a particular entity performs an event which comprises accessing a processing network on a given port(s), the particular entity is determined as the starting entity 500.

Optionally, two or more starting rules may be combined using logical operators (ie AND/OR/NOT etc) to generate one or more meta-starting entity rules used to determine the starting entity.

The starting entity rules may be automatically applied in the background of the processing system 100 without a user of the processing system 100 initiating the task. Alternatively, the user may initiate the task to identify the starting entity 500 in the processing system 100. When a positive determination occurs using the starting entity rules, the starting entity 500 has been identified.

For example, a processing system 100 may comprise the following entities:

TABLE 1

Example of entities in a processing system

| Entity Name | Time entity was created/last modified | Hidden Property |
|---|---|---|
| Explorer.exe | 1/2/2005 | No |
| Spywarz.exe | 1/2/2006 | Yes |
| Word.exe | 1/3/2005 | No |

The starting entity rules in this particular example may comprise the following:

1. If a particular entity was created or modified after 31 Jan. 2006, the particular entity is determined as the starting entity 500; and
2. If a particular entity has a hidden property, the particular entity is determined as the starting entity 500.

When the starting entity rules are used in relation to the entities from Table 1, it is apparent that "Spywarz.exe" is determined as being the starting entity 500, and that "Explorer.exe" and "Word.exe" are not considered starting entities 500. In this particular case, a majority of the starting entity rules have been satisfied for "Spywarz.exe". Therefore, "Spywarz.exe" is identified as the starting entity 500.

Although, in the above example, the identification was determined using the results of the majority of starting entity rules, other factors may be used to determine whether a particular entity in the processing system 100 is the starting entity 500. A weighting may be defined in association with at least some of the starting entity rules. For example, the first starting entity rule may be given a weighting of 0.6, whereas the second starting entity rule may be given a weighting of 0.4. The weighting of each satisfied starting entity rule may be summed or used in a calculation, and compared to a threshold to determine if the particular entity is the starting entity 500.

The step of identifying the starting entity 500 may alternatively comprise selecting the starting entity 500 in the processing system 100. For example, a user may manually select a starting entity 500 in the processing system 100 using an input device such as a mouse. This may occur when a user of the processing system 100 wishes to determine whether a particular entity is malicious to the processing system 100.

At step 420, the method 400 comprises determining one or more characteristics 250 of the starting entity 500. The one or more characteristics 250 of the starting entity 500 can comprise behaviour 253 performed by the starting entity 500, and/or attributes 255 of the starting entity 500.

For example, the behaviour 253 performed by the starting entity 500 may comprise, but is not limited to, performing self-duplication (ie. the starting entity 500 making a copy of itself), connecting the processing system 100 to a remote network address, and downloading data from the remote network address. Each of these behaviours 253 of the entity 500 is a characteristic of the entity.

The processing system 100 can comprise a behaviour recordal module 243 which uses API interception to monitor and record behaviours 253 performed by the processing system 100. The behaviours 253 can be legitimate and illegitimate behaviours. The behaviour 253 performed and the entity associated with the behaviour 253 can be recorded in memory of the processing system 100. In one form the behaviour 253 and associated entity are recorded in a database. When determining the characteristics 250 of the starting entity 250, the database can be queried using the name of the starting entity 500 to determine behaviours 253 that have been performed by the starting entity 500.

In regard to attributes of the starting entity 500, examples comprise a discrepancy in a checksum for the starting entity, a size of the entity (bytes), a hidden property of the starting entity, and file permissions (ie read, write, execute).

The processing system 100 can comprise an attribute determinator 245 which, when invoked by the processing system 100, can determine the one or more attributes of the starting entity 500. For example, the attribute module can determine whether the starting entity 500 is configured to be hidden in the processing system 100.

At step 430, the method 400 comprises determining a characteristic threat value (CTV) 270 for at least some of the one or more characteristics 250 of the starting entity 500.

In one form, at least one of the one or more characteristics 250 of the starting entity 500 is associated with a CTV formula 265. The method 400 can comprise calculating, using the CTV formula 265, the CTV 270.

In one form, a CTV formula 265 can be configured to assign a constant CTV 270 for the respective characteristic 250. For example, if the starting entity 500 has a hidden property attribute 255, the associated CTV formula 265 may be simply a constant value indicative of a level of threat that the hidden property attribute 255 represents to the processing system 100, as shown below:

CTV=0.3

In additional or alternative forms, CTV formulas 265 can be configured to use a recorded frequency as an input when calculating the CTV 270. For example, if the starting entity 500 has previously caused the processing system 100 to connect to a remote network address on ten instances, the CTV 270 is adjusted according to the frequency of the behaviour 253 being recorded in the processing system 100, as shown below:

CTV=0.01×freq=0.01×10=0.1

The frequency may also be determined for a period of time. For example, if the starting entity 500 connected to the remote network address on ten instances within the past five minutes, then the CTV 270 is adjusted accordingly for this frequency within this period of time.

In further additional or alternative forms, at least one CTV 270 is temporally dependent. The CTV formula 265 can be configured to calculate the CTV 270 using a temporal value. For example, a starting entity 500 may have connected to a remote network ten days ago. This period of time is used by the CTV formula 265 in determining the CTV 270, as shown below:

$$CTV = 0.1 \times e^{\frac{1}{Time}} = 0.1 \times e^{\frac{1}{10}} = 0.1 \times 1.11 = 0.12$$

In the event that the starting entity 500 caused the processing system 100 to connect to the remote network address one day ago, the CTV 270 would be calculated as:

$$CTV = 0.1 \times e^{\frac{1}{Time}} = 0.1 \times e^{\frac{1}{1}} = 0.1 \times 2.72 = 0.27$$

As can be seen from the above CTVs 270, the CTV 270 is adjusted according to how recent the behaviour 253 was recorded. CTVs 270 can increase or decrease in response to the temporal value used by the CTV formula 265. Furthermore, the rate at the CTV 270 increases and decreases may be constant or variable.

As previously discussed, characteristics 250 can comprise legitimate characteristics indicative of non-malicious activity, and illegitimate characteristics indicative of malicious activity. An example of a legitimate characteristic of a starting entity 500 comprises having trusted vendor name attribute (ie. a trusted vendor attribute may be "Microsoft Corporation"). An example of an illegitimate characteristic comprises the starting entity having full read, write and execute permissions.

CTVs 270 for legitimate characteristics and illegitimate characteristics can be calculated using the associated CTV formulas 265. In one form, illegitimate characteristics have a positive CTV 270, and illegitimate characteristics have a negative CTV 270. However, it will be appreciated that this is not essential.

At step 440, the method 400 comprises determining the ETV 290 for the starting entity 500 using one or more of the CTVs 270 determined for at least some of the characteristics 250 of the starting entity 500.

For example, a starting entity 500 may have the following CTVs 270:

CTV1=0.1

CTV2=0.5

CTV3=0.7

CTV4=−0.4

Referring to the above CTVs 270, four characteristics of the starting entity were determined. Three of the characteristics 250 are illegitimate (as indicated by the positive CTVs 270) and one of the characteristics 250 is legitimate (as indicated by the negative CTV 270). The ETV 290 can be determined by summing the CTVs 270 for the starting entity 500. In this example the ETV 290 would be calculated as:

$$ETV = \sum_{x=1}^{4} CTVx = 0.1 + 0.5 + 0.7 - 0.4 = 0.9$$

In instances where the CTV 270 is not indicative of whether the characteristic 255 is legitimate or illegitimate, the ETV 290 can be calculated by determining a difference between the CTVs 270 for the one or more legitimate characteristics 250 of the entity 500, and the CTVs 270 for the one or more illegitimate characteristics 250 of the entity 500, where the difference is indicative of the ETV 290.

In some instances an ETV 290 may have been previously calculated for the starting entity 500 and recorded in the processing system's 100 memory. In this event, the new ETV 500 can be determined by using the CTVs 270 and the previously stored ETV 290.

At step 450, the method 400 comprises comparing the ETV 290 of the starting entity 500 to the ETT 225 to determine if the starting entity 500 is a malicious entity 299. In one form, if the ETV 290 is greater than or equal to the ETT 225, the starting entity 500 is identified as being malicious 299.

For example, the ETT 225 may be equal to '0.85'. In this instance the ETV 290 equals '0.9' which is greater than the ETT 225. Therefore, the starting entity 500 is identified as being a malicious entity 299.

In another form, the ETV 290 can be used as an input to a fuzzy logic system, wherein the fuzzy logic system determines whether the starting entity 500 is considered malicious 299 using the ETV 290.

Optionally, at step 460, the method 400 comprises restricting malicious activity being performed by the malicious entity 299. In one form, this may comprise quarantining the malicious entity 299. In another form, this may comprise removing or modifying the malicious entity 299.

Figure 5A:
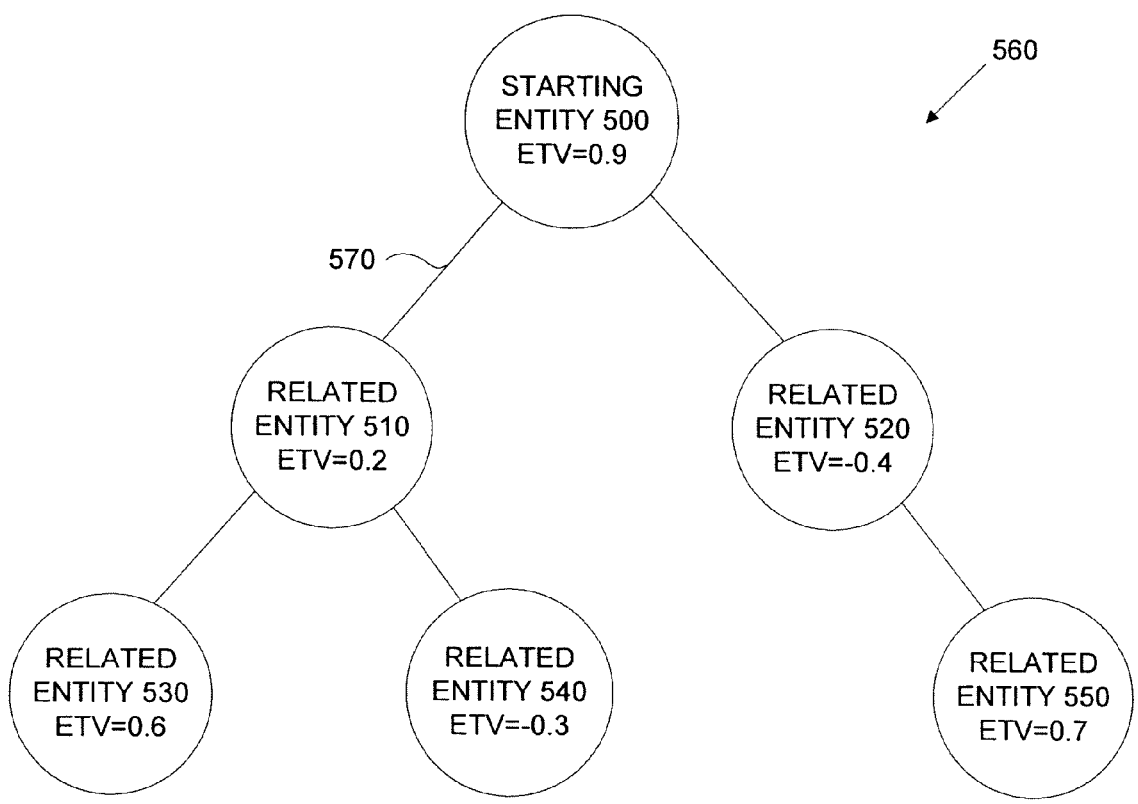
FIG. 5A illustrates a block diagram representing a determination of a malicious entity using related entities.

Referring now to FIG. 5A, there is shown block diagram illustrating the identification of a malicious entity using related entities.

In particular, related entities 560 can be determined relative to the starting entity 500. Related entities 560 may be directly or indirectly related to the starting entity 500. ETVs 290 associated with each related entity 510, 520, 530, 540, 550 can be used to determine whether the starting entity 500 is malicious 299. In other forms, the ETVs of the group of related entities 560 can be used to determine whether at least part of the group 560 is malicious 299.

In FIG. 5A, each entity is represented as a node. Links 570 between nodes illustrate the relatedness of the entities. For example, there is a direct link between starting entity 500 and entity 510. There is also an indirect link between the starting entity 500 and entity 530 via entity 510.

Once a group of related entities 560, relative to the starting entity 500, has been determined, a threat value can be determined based on the group of related entities 560.

Figure 5B:
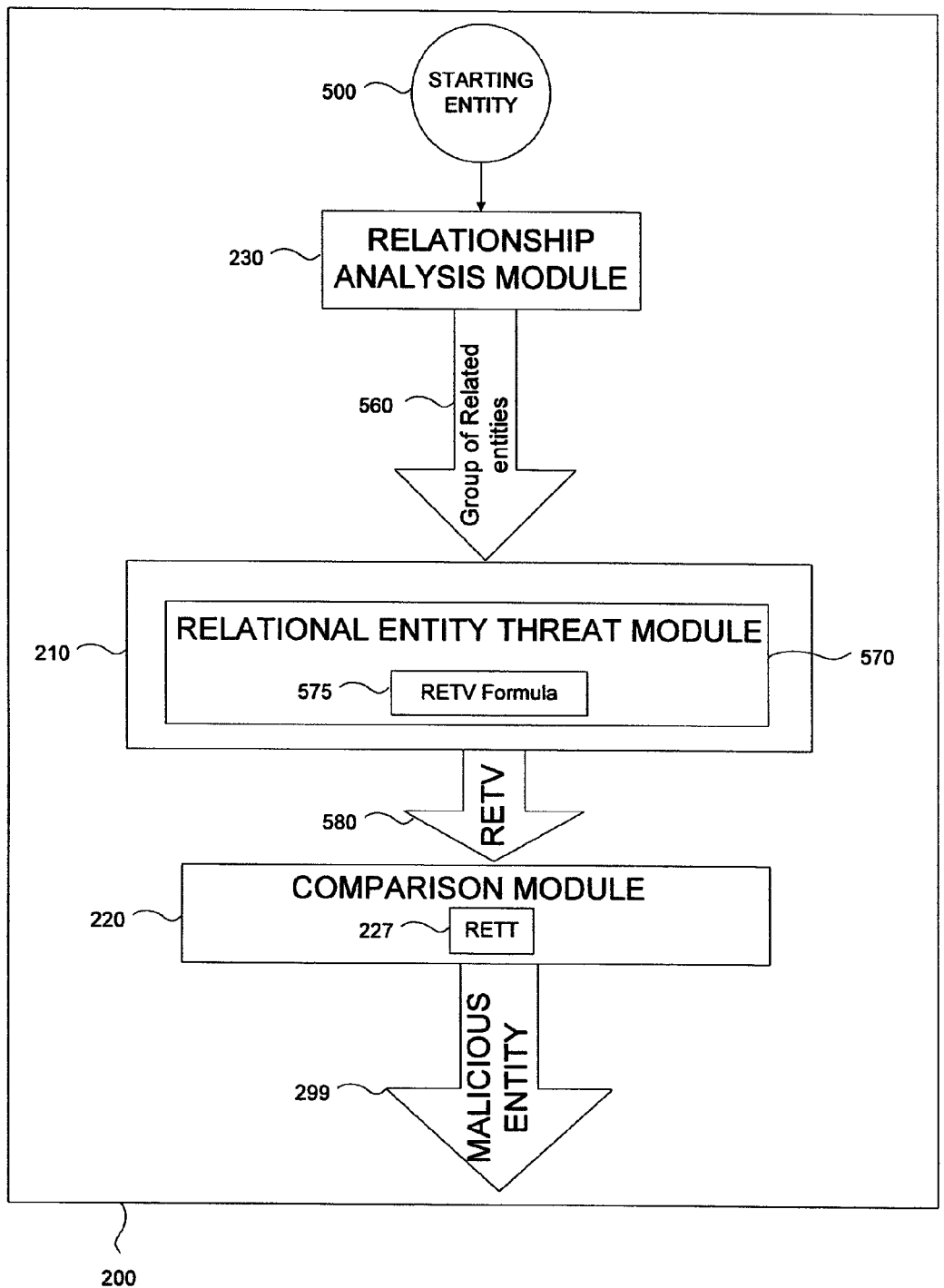
FIG. 5B illustrates a block diagram illustrating a system to identify a malicious entity using related entities.

The threat value for the starting entity 500 can be calculated based on the related entities 510, 520, 530, 540, 550 to the starting entity 500, as illustrated in FIG. 5B. This type of threat value which is determined for the starting entity 500 using the group of related entities 560 is referred to as a "relational entity threat value" (RETV) 580. The RETV 580 can be used to determine whether the starting entity 500 is malicious to the processing system 100 based additionally upon the related entities 510, 520, 530, 540, 550 to the starting entity 500.

Figure 5C:
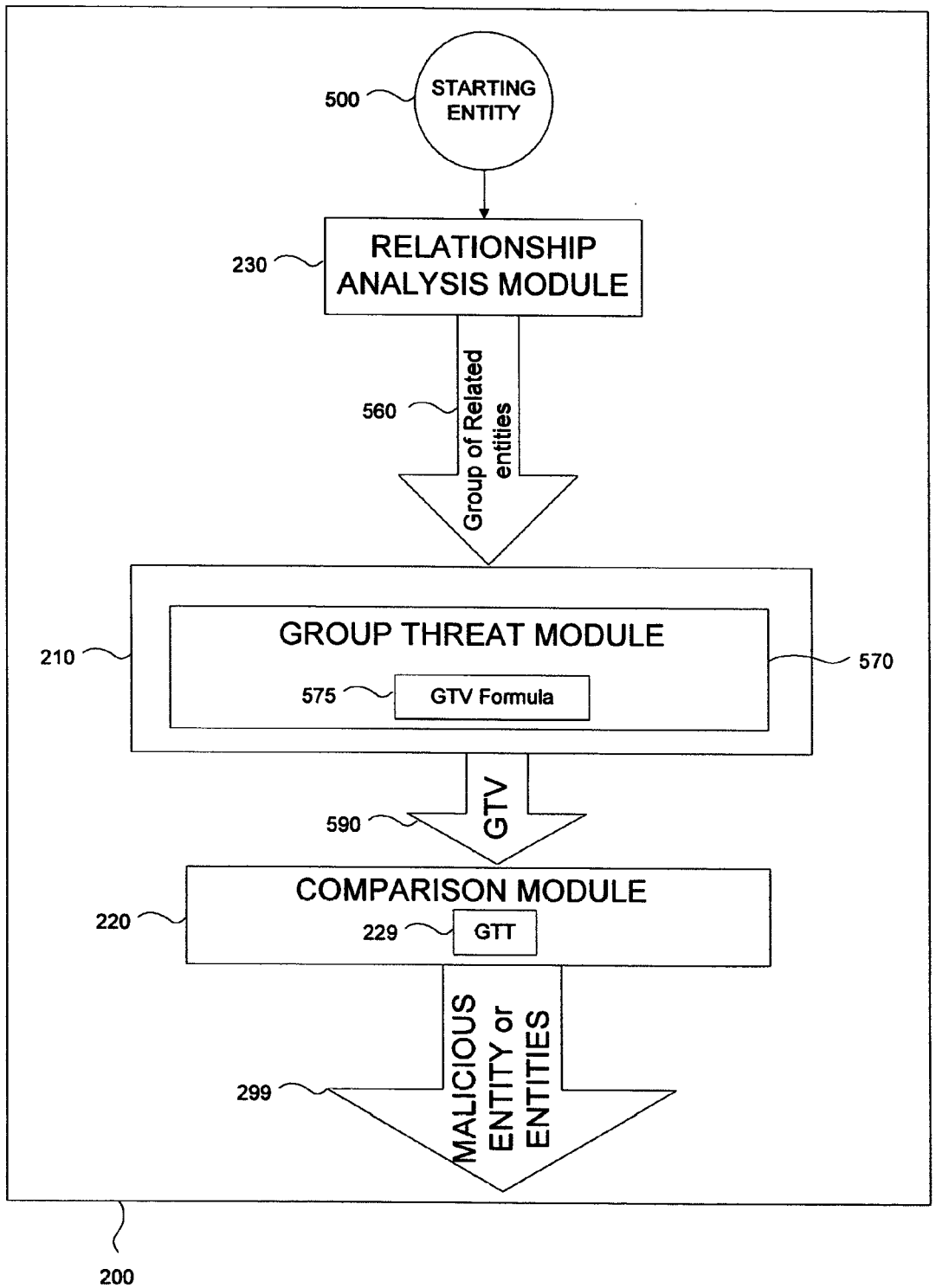
FIG. 5C illustrates another block diagram illustrating a system to identify a malicious entity using related entities.

Additionally or alternatively a threat value can be calculated for the group of related entities (which comprises the starting entity) 560 to determine whether the group of related entities 560 is malicious to the processing system 100, as illustrated in FIG. 5C. This type of threat value which is determined for the group of related entities 560 is referred to as a "group threat value" (GTV) 590. The GTV 590 can be used to determine whether the group of related entities 560, or at least a part of the group of related entities 560, is malicious 299 to the processing system 100.

The RETV 580 can be calculated by summing the ETVs 290 for each entity 500, 510, 520, 530, 540, 550 in the group of related entities 560, and adjusting each ETV 290 according to the relatedness of the respective related entity 500, 510, 520, 530, 540, 550 relative to the starting entity 500.

In one form, the number of links 570 between one of the related entities 500, 510, 520, 530, 540, 550 and the starting entity 500 can be used as an indicator of the relatedness of the related entity 500, 510, 520, 530, 540, 550. This number of links 570 between the starting entity 500 and a related entity 500, 510, 520, 530, 540, 550 in the group 560 is referred to herein as the "link distance". A related entity which has a direct link (ie. a low link distance) to the starting entity 500 is given more weight compared to a related entity which has an indirect link (ie. a higher link distance) to the starting entity 500. The higher the link distance, the less weight is provided for the ETV 290 of the related entity when calculating the RETV 580. An example RETV formula 575 to calculate the RETV 580 is provided below:

$$RETV = \Sigma ETV \times 0.5^{LinkDist}$$

Where:
LinkDist is the link distance
For example, the RETV 580 for the group of related entities 560 illustrated in FIG. 5A would be calculated as:

$$RETV = \Sigma ETV \times 0.5^{LinkDist}$$

$$RETV = 0.9 \times 0.5^0 + (0.2 - 0.4) \times 0.5^1 + (0.6 - 0.3 + 0.7) \times 0.5$$

$$RETV = 0.9 - 0.1 + 0.05 = 0.85$$

The RETV 580 can then be compared to a relational entity threat threshold (RETT) 227 to determine whether the starting entity 500, based on the related entities 510, 520, 530, 540, 550 is malicious 299. In this example, the RETT 227 may be '0.8'. Therefore, the RETV 575 is greater than RETT 227, thereby identifying the starting entity 500 as a malicious entity 299.

Similarly to the process of calculating the RETV 580, the GTV 590 can be calculated by summing the ETVs 290 for each entity 500, 510, 520, 530, 540, 550 in the group of related entities 560, and then averaging the sum over the number of entities in the group 560. An example GTV formula 575 to calculate the GTV 590 is provided below:

$$GTV = \frac{\sum ETV}{n}$$

where n is the number of entities in the group of related entities 560

Referring to the group of related entities 560 shown in FIG. 5A, the GTV 590 would be calculated as:

$$GTV = \frac{\sum ETV}{n}$$

$$GTV = \frac{0.5 + 0.2 - 0.4 + 0.6 - 0.3 + 0.7}{6}$$

$$GTV = \frac{1.3}{6} = 0.22$$

The GTV 590 can then be compared to a group threat threshold (GTT) 229 to determine whether the group of related entities 560 is malicious 299, or whether at least a portion of the related entities 560 is malicious 299. In this example, the GTT may be 0.5. In this instance, the GTV is less than the GTT which indicates that the group of related entities 560 is not malicious.

Figure 6A:
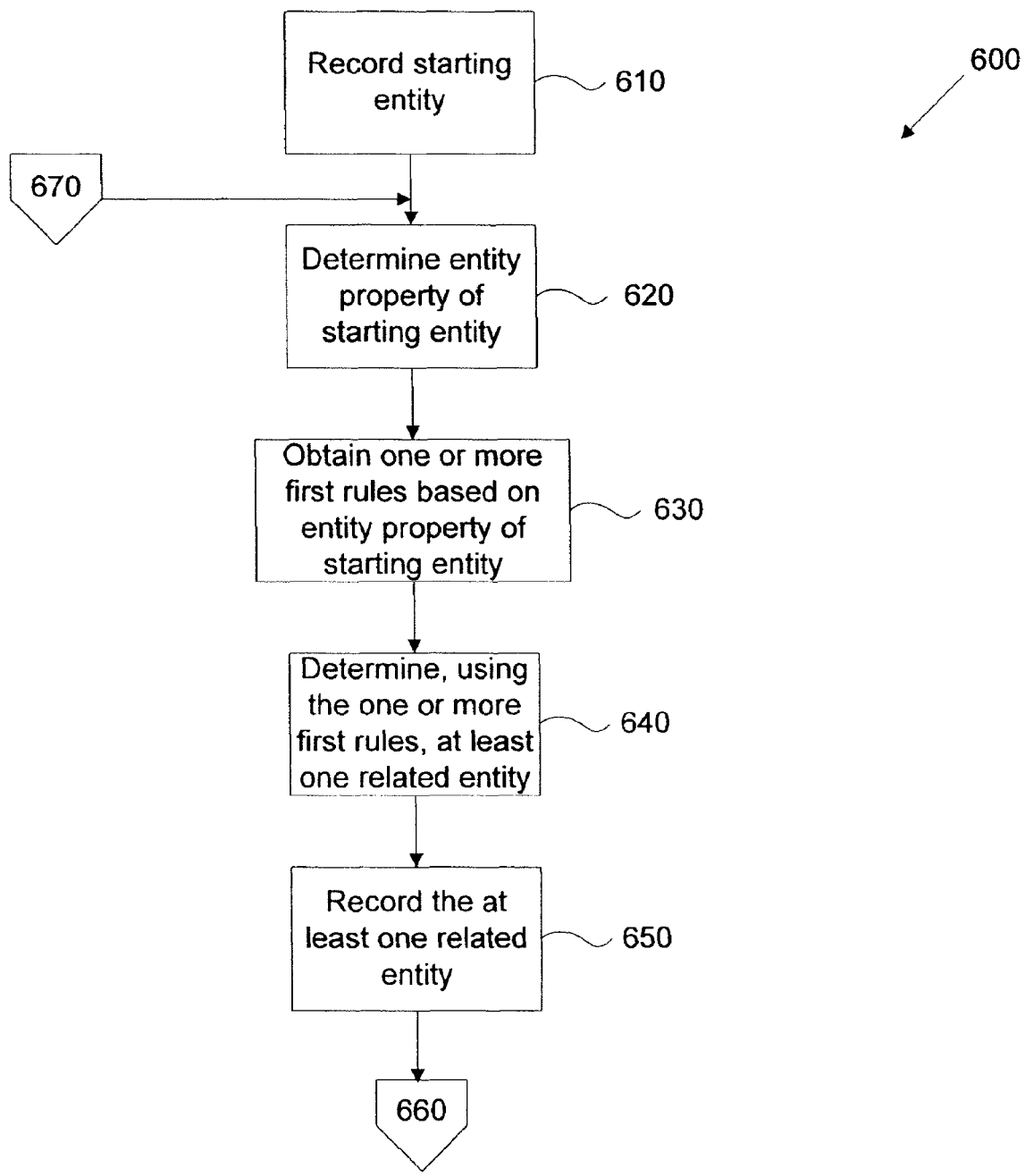
FIGS. 6A and 6B illustrate a flow diagram representing an example method of determining a group of related entities to identify a malicious entity.
Figure 6B:
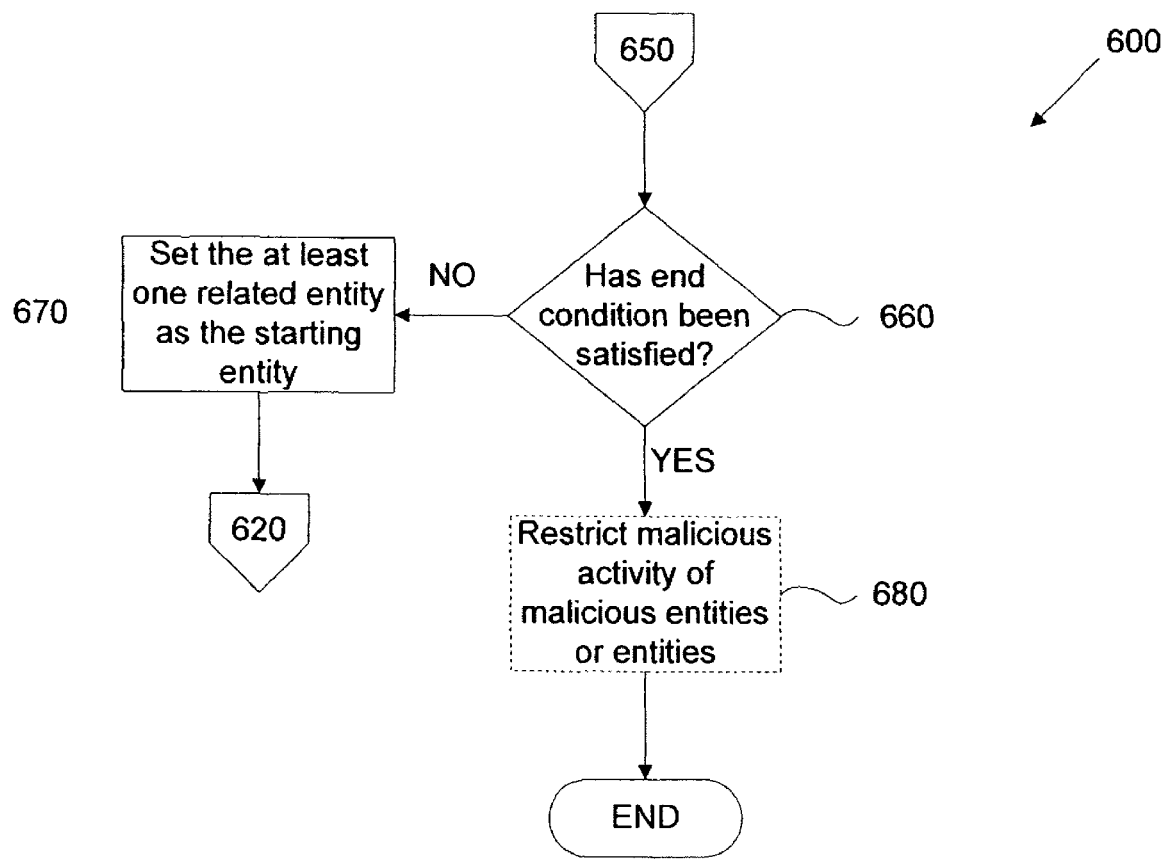

Referring now to FIGS. 6A and 6B, there is shown a method 600 of determining related entities 500, 510, 520, 530, 540, 550 relative to the starting entity 500. Method 600 determines a group of suspicious related entities relative to the starting entity 500. However, it will be appreciated that method 600 can be adapted to determine any form of related entities, such as trusted related entities relative to the starting entity 500.

At step 610, the method 600 comprises recording the starting entity 500. This generally comprises the processing system 100 recording the starting entity 500 in the processing system memory, such as a data store. The starting entity 500 may be stored in the form of a table or list.

At step 620, the method 600 comprises determining an entity property associated with the starting entity 500. The entity property may be an entity type of the entity, such as whether the starting entity 500 is an executable entity, a run key entity or a dynamic linked library entity. The entity property may also be a time that the starting entity 500 was created or modified. The entity property may comprise the directory which the starting entity 500 is contained within. The entity property may also be a vendor name associated with the starting entity 500. The entity property may also be a particular network address from which the starting entity 500 was downloaded.

It will be appreciated that more than one entity property may be determined for the starting entity 500. However, for the purposes of simplicity, throughout this example it will be assumed that one entity property has been determined for the starting entity 500.

At step 630, the method 600 comprises obtaining, based on the entity property of the starting property 500, one or more related entity rules. In this particular example, the one or more related entity rules take the form of one or more rules for determining suspicious entities related to the starting entity 500. Step 630 may comprise selecting, based on the entity property, the one or more related entity rules from a larger set of related entity rules. Each related entity rule is associated with a particular entity property, and as such, a selection of a related entity rules can be performed based on the entity property of the starting entity 500. An example list of entity properties and corresponding related entity rules is shown below in List 2.

(i) if the starting entity comprises a vendor name, the at least one suspicious related entity is one or more entities comprising the same vendor name;
(ii) if the starting entity comprises a product name, the at least one suspicious related entity is one or more entities comprising the same product name;
(iii) if the starting entity comprises a version name, the at least one suspicious related entity is one or more entities comprising the same version name;
(iv) if the starting entity was created at a particular time in the one or more processing systems, the at least one suspicious related entity is one or more entities which were created at a similar time to that of the starting entity;
(v) if the starting entity accesses a particular network address or network address range or network address names, the at least one suspicious related entity is one or more entities which also access the same particular network address or network address range or network address names.
(vi) if the starting entity accesses a particular network address or network address range, the at least one suspicious related entity is the particular network address or network address range or network address names.
(vii) if the starting entity causes another process to execute, the at least one suspicious related entity is one or more entities which was executed by it.
(viii) if the starting entity was executed by a process, the at least one suspicious related entity is one or more entities which executed the starting entity.

(ix) If the starting entity creates or modifies an entity, the at least one suspicious related entity is one or more entities which it creates or modifies.
(x) If the starting entity is found in a directory not in a list of whitelist directories, the at least one suspicious related entity is one or more entities which also exist in the same directory.
(xi) If the starting entity is downloaded from the internet/tcpip, the at least one suspicious related entity is one or more entities which were downloaded at the same time or by the same process or from the same particular network address or network address range or network address names.

List 2: Example of Entity Properties and Corresponding Related Entity Rules

It will be appreciated that a more detailed list of entity properties and corresponding related entity rules can be obtained using the above general rules. An example of a more detailed list of entity properties and corresponding related entity rules are provided below.

TABLE 2

Further example of Entity Properties and corresponding related entity rules

| Entity Property | Related Entity Rule |
|---|---|
| trigger entity | The one or more suspicious related entities are triggerable entities which are triggerable by the run-key entity |
| executable entity | The one or more suspicious related entities are one or more files in an INF file associated with the starting entity |
| executable entity | The one or more suspicious related entities are one or more trigger entities which trigger the starting entity |
| executable entity | The one or more suspicious related entities are one or more favourites which trigger the starting entity |
| executable entity | The one or more suspicious related entities are one or more items of embedded executable content inside the starting entity |
| executable entity | The one or more suspicious related entities are one or more instances of windows created by the executable entity |
| executable entity | The one or more suspicious related entities are one or more desktop link files (short cuts) which trigger the executable entity |
| executable entity | The one or more suspicious related entities are one or more modules loaded by the starting entity |
| executable entity | The one or more suspicious related entities are one or more classids or guids assocaiated with the starting entity |
| executable entity | The one or more suspicious related entities are one or more network addresses or network address ranges or network address names associated with the starting entity |
| classid/guid entity | The one or more suspicious related entities are one or more BHO or TOOLBAR names associated with the classid/guid |
| classid/guid entity | The one or more suspicious related entities are one or more one or more class names associated with the classid/guid |
| classid/guid entity | The one or more suspicious related entities are one or more network addresses or network address ranges or network address names associated with the starting entity |
| classid/guid entity | The one or more suspicious related entities are one or more executable entities related to the classid/guid |
| module entity | The one or more suspicious related entities are one or more executable entities that are loaded by the module entity |
| network address/network address range/network address name | The one or more suspicious related entities are one or more files associated with the network address or network address range or network address name |
| network address/network address range/network address name | The one or more suspicious related entities are one or more links or short cuts associated with the network address or network address range or network address name |
| network address/network address range/network address name | The one or more suspicious related entities are one or more classids associated with the starting entity |
| network address/network address range/network address name | The one or more suspicious related entities are one or more favourites associated to the starting entity |
| network address/network address range/network address name | The one or more suspicious related entities are one or more executable entities related to the starting entity |
| network address/network address range/network address name | The one or more suspicious related entities are one or more start pages related to the starting entity |
| network address/network address range/network address name | The one or more suspicious related entities are one or more cookies related to the starting entity |
| BHO Tool Bar entity | The one or more suspicious related entities are one or more classids associated with the starting entity |
| BHO Tool Bar entity | The one or more suspicious related entities are one or more names associated with the starting entity |
| BHO Tool Bar entity | The one or more suspicious related entities are one or more executable entities executed by the starting entity |

TABLE 2-continued

Further example of Entity Properties and corresponding related entity rules

| Entity Property | Related Entity Rule |
| --- | --- |
| Favourites entity | The one or more suspicious related entities are one or more network addresses or network address ranges or network address names |
| Favourites entity | The one or more suspicious related entities are one or more executable entities executed by the starting entity |
| Links entity | The one or more suspicious related entities are one or more network addresses or network address ranges or network address names |
| Links entity | The one or more suspicious related entities are one ore more executable entities executed by the starting entity |
| Cookie entity | The one or more suspicious related entities are one or more network addresses or network address ranges or network address names associated with the starting entity |
| windows instance entity | The one or more suspicious related entities are one ore more executable entities that create the starting entity |
| Directory (not in a whitelist) entity | The one or more suspicious related entities are one or more entities that exist in that same directory. |
| INF entity | The one or more suspicious related entities are one or more entities referenced in the starting entity |
| Archive entity | The one or more suspicious related entities are one ore more entities within the archive entity |
| Archive entity | The one or more suspicious related entities are one or more entities in the same directory as the archive entity which fail to appear in a whitelist |
| vendor name of entity | The one or more suspicious related entities are one or more entities which share the same vendor name as the starting entity |
| product name entity | The one or more suspicious related entities are one or more entities which share the same product name as the starting entity |
| version name | The one or more suspicious related entities are one or more entities which share the same version name as the starting entity |
| Creation/Modification time of entity | The one or more suspicious related entities are one or more entities which a similar creation/modification time |

It will be appreciated that a starting entity having a trigger entity property could be any one of the following entities: run keys, Appinit, Uninstall Key, Service, Hooks, protocol filter, and a startup list. It will further be appreciated that a starting entity having an executable entity property could be any one of the following entities: executables, dynamic linked libraries, and other modules.

It will be appreciated from List 2 that the general entity properties and related entity rules can be extended to specific entity types, such as the entity types shown in Table 2, for example INF entities, Cookies entity, windows instance entity and the like shown above. The more specific rules in Table 2 allow for a more specific selection of rules based on the more specific entity property, which can therefore result in accurately determining the relevant suspicious related entity rules.

It will also be appreciated from Table 2 that more than one related entity rule can be obtained based on the one or more entity properties of the starting entity. As shown above in Table 2, if the entity property indicates that the starting entity is an executable entity, then nine separate types of related entity rules can be applicable for determining the related entities to the starting entity which are considered suspicious.

Additionally or alternatively, the processing system 100 may transfer, to a server processing system 720, one or more entity properties of the starting entity 500, and receive, from the server processing system, the one or more related entity rules. In this step, the server processing system 720 may select the one or more related entity rules using the entity property from a server set of related entity rules, and then transfer the one or more related entity rules to the processing system 100.

At step 640, the method 600 comprises determining, using the one or more related entity rules, the at least one related entity 510, 520. In this particular example the related entity rules determine related suspicious entities. For simplicity purposes, the following example is presented using one related entity rule, however, it will be appreciated that more than one related entity rule can be used. Using the example from Table 1, "Spywarz.exe" comprised a vendor name of "Spywarz Software Enterprises". Therefore, this entity property is used to obtain a related entity rule such as:

"The one or more related entities have a vendor name equalling 'Spywarz Software Enterprises'".

This related entity rule is then used to determine any entities in the processing system 100 which satisfy this rule. Once a scan has been performed using the related entity rule, it is determined that "Spywarz.dll" also shares a vendor name of "Spywarz Software Enterprises". As the related entity rule has been satisfied, "Spywarz.dll" is considered a related entity to the starting entity "Spywarz.exe". As such, a group of suspicious related entities has been determined which comprises "Spywarz.exe" and "Spywarz.dll".

Optionally, weighted values may be associated with the related entity rules.

Steps 610 to 640 represent a single iteration to determine a group of suspicious related entities 510, 520. However, if a more detailed group of related entities is required, it is possible to perform multiple iterations of steps 610 to 640, as will now be discussed.

At step 650, the at least one related entity 510, 520 is recorded. This may involve adding the at least one related entity 510, 520 to a list or a table which comprises the starting entity 500 recorded at step 610. Furthermore, the list or table may comprise data indicative of the relationship between the at least one related entity 510, 520 and entities which have been previously recorded.

At step 660, the method 600 comprises determining if an end condition has been met. For example, the end condition may be satisfied when no other related entities are determined; when no other related entities are determined in a period of time; when the current starting entity has an entity type which is indicative of the end condition; and/or when a selected number of repetitions have been performed. If the end condition has not been met, the method 600, the method 600 continues to step 670.

At step 670, the method 600 comprises setting the at least one related entity 510, 520 as the starting entity 500. This may be performed in memory by reassigning the value of the starting entity 500. By setting the at least one related entity 510, 520 as the starting entity 500, steps 620 to 670 can be repeated until an end condition is met, as will be discussed in more detail below. As will be appreciated in this example, there are now two starting entities due to two related entities being determined in the first iteration.

Once the end condition is satisfied, the determination of the group of suspicious related entities 560 has been completed. Optionally, the recordings can be presented to a user of the processing system 100. The group of related entities 560 may be presented in a tabular form or may be presented in a graphical representation. Additionally, the group of related entities 560 may presented indicating direct or indirect links between entities in the group. For example, 'Spywarz.exe' and 'Spywarz.dll' for the above example would have a direct link. However, if a subsequent related entity to 'Spywarz.dll' was determined to be a system variable 'SPYWARZ_VARIABLE', then there would be an indirect link between 'Spywarz.exe' and 'SPYWARZ_VARIABLE'.

Figure 7:
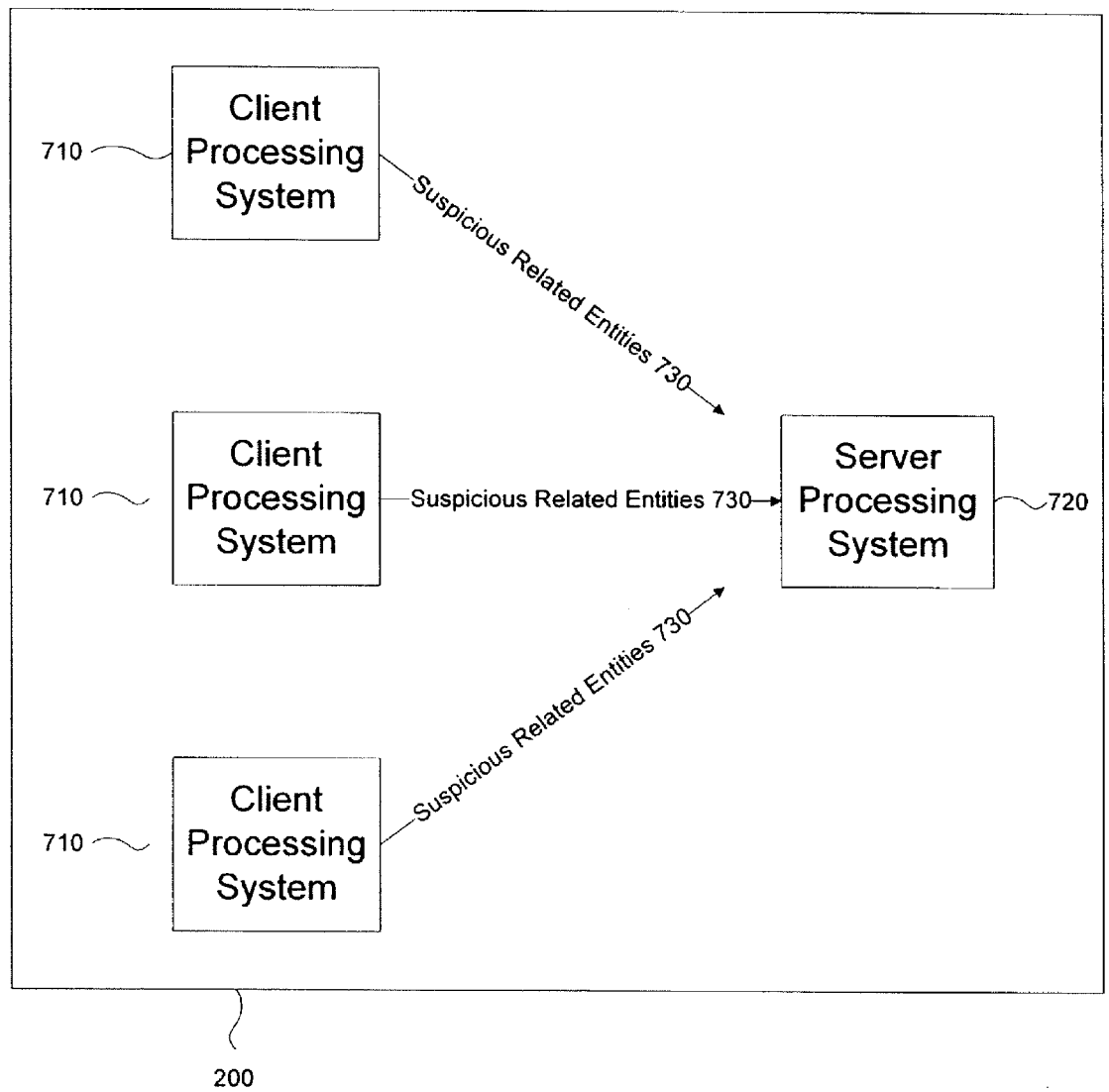
FIG. 7 illustrates a block diagram representing another example of a system to identify a malicious entity using a client and server processing system.

Referring now to FIG. 7, there is shown another example of a system 700 comprising at least one client processing system 710 and at least one server processing system 720. The system 200 can be configured to determine a malicious entity 299 in at least one of the client processing systems 710.

Each client processing system 710 is configured to determine a starting entity 500, determine a group of suspicious related entities 560, and determine whether the starting entity 500 and/or whether the group of suspicious related entities 560 represents a possible threat to the client processing system. If the starting entity 500 or the group of related suspicious entities 560 represents a possible threat to the respective client processing system 710, the respective client processing system 710 transfers suspicious entity data 730 indicative of the one or more suspicious entities 560 to the server processing system 720. The server processing system 720 is configured to analyse the suspicious entity data 730 to determine whether one or more of the suspicious entities 560 are malicious 299 to one or more of the client processing systems 710.

Figure 8:
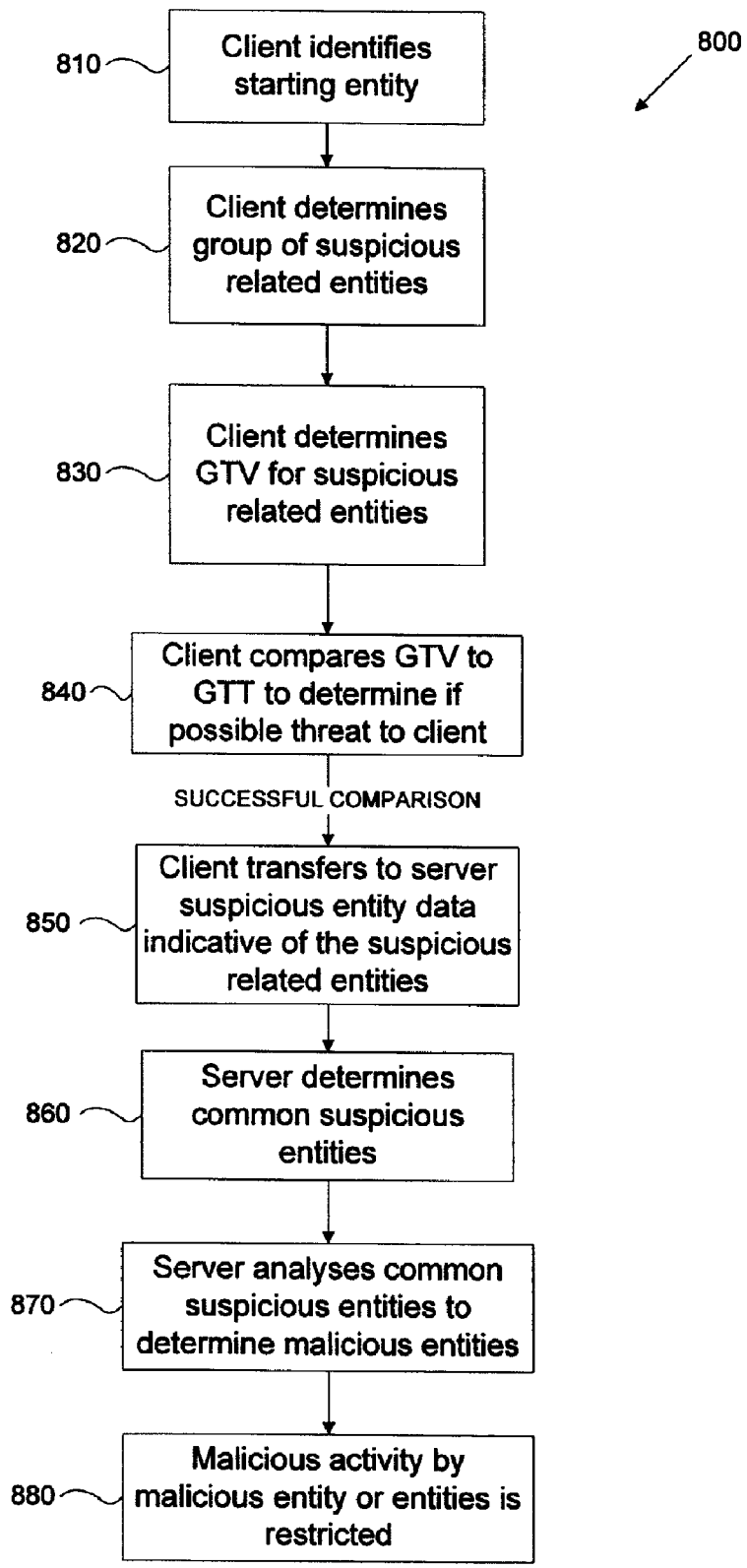
FIG. 8 illustrates a flow diagram representing an example of a method of determining one or more malicious entities using the example system of FIG. 7.

Referring now to FIG. 8 there is shown a flow diagram illustrating a method of determining one or more malicious entities using the example system of FIG. 7.

In particular, at step 810, the method 800 comprises identifying a starting entity 500. At step 820, the method 800 comprises determining a group of suspicious related entities 560. At step 830, the method 800 comprises determining the GTV 590 of the group of related entities. At step 840, the method 800 comprises comparing the GTV 590 to the GTT 229 to determine whether the group of suspicious related entities 560 represents a possible threat to the client processing system 710.

In the event that the group of suspicious related entities 560 represents a possible threat to the client processing system 710, the client processing system 710 transfers suspicious related entity data 730 indicative of the group of suspicious entities 560 to the server processing system at step 850. At step 860, the method 800 comprises the server processing system 730 determining common suspicious related entities with other records received from other client processing systems 710. At step 870, the method 800 comprises the server processing system 720 analysing the common suspicious related entities to determine if one or more of the suspicious related entities is malicious 299. Optionally, at step 880, the method 800 comprises restricting malicious activity performed by one or more malicious entities 299.

It will be appreciated from method 800 that there is a distinction between suspicious and malicious entities. A suspicious entity represents a possible threat to the client processing system 710. A malicious entity 299 represents a threat to the client processing system 710. A more detailed analysis of one or more suspicious entities can be performed at the server processing system 720 such as to determine any malicious entities 299. As the detailed analysis can be performed at a central location such as the server processing system 720, the risk of one of the client processing systems 710 failing to identify a malicious entity 299 due to an outdated dictionary is reduced.

Figure 9:
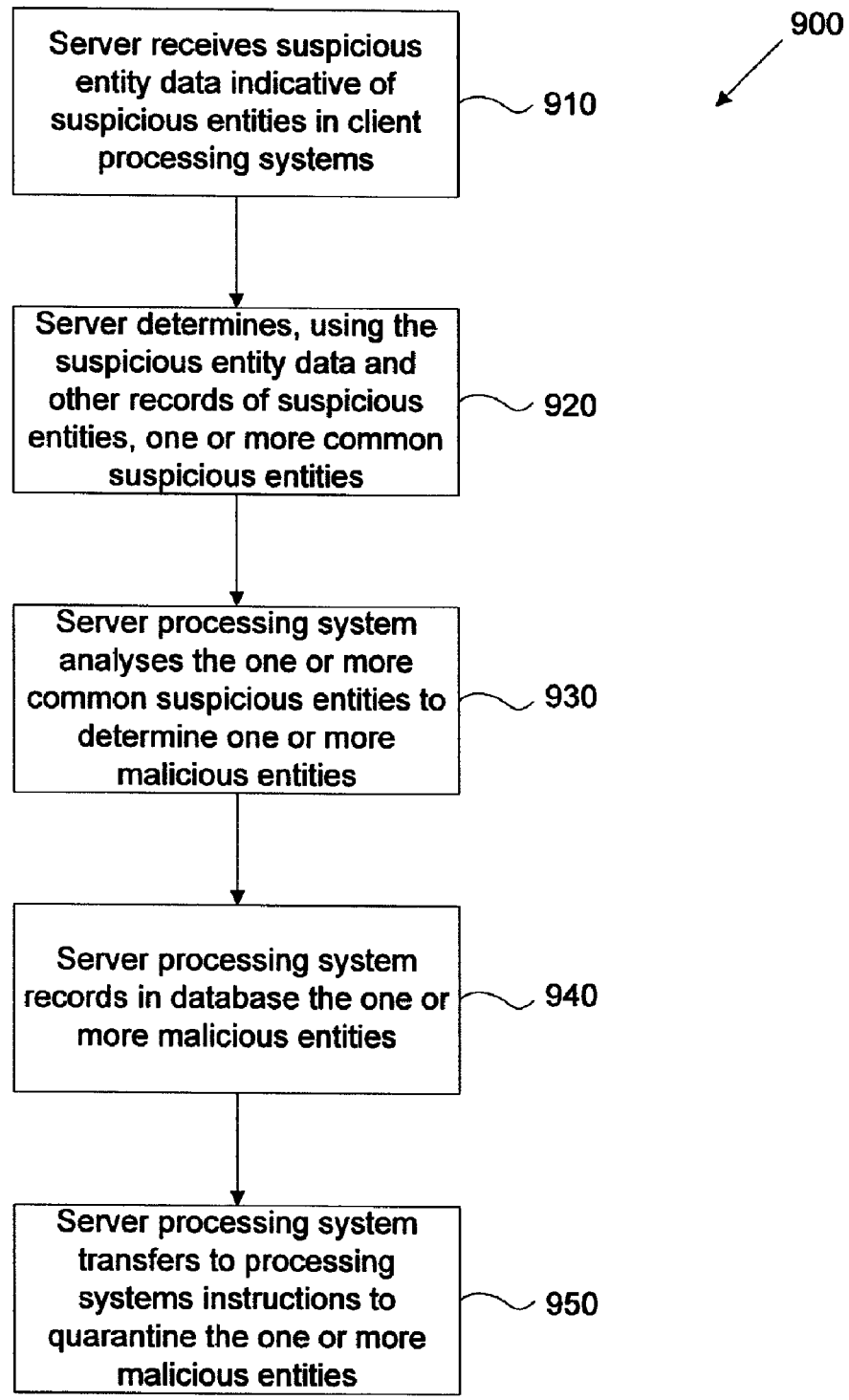
FIG. 9 illustrate a flow diagram representing an example method of identifying a malicious entity in a server processing system.

Referring now to FIG. 9 there is shown a flow diagram illustrating an example method 900 of identifying one or more malicious entities at the server processing system 720.

In particular, at step 910 the method 900 comprises receiving, in the server processing system 720, the suspicious related entity data 730 from the one or more client processing systems 710 described above. The suspicious related entity data 730 may comprise measurements and or properties associated with each suspicious related entity in the group 560.

Additionally or alternatively, the suspicious related entity data 730 may be the actual entities which are transferred from the one or more client processing systems 710 to the server processing system 720. The server processing system 720 may also receive a suspicion identifier indicative of behaviour associated with the suspicious entities 560. For example, the suspicious identifier may be indicative of the suspicious entities 560 being associated with a pop-up window being displayed at the client processing system 710 at regular intervals. The suspicious related entity data 730 may also comprise data indicating the starting entity 500 in the group 560.

At step 920, the server processing system 720 determines, using the suspicious related entity data 730, one or more common suspicious entities. This step comprises determining if the suspicious entity data 730 received from the client processing system 710 comprises one or more suspicious entities in common with other records of suspicious entity data 730 received from other client processing systems 710. If suspicion identifiers were received from the client processing systems 710 in relation to the suspicious entity data 730, the server 720 may use the suspicion identifier to narrow the selection of common suspicious entities. By determining the common suspicious entities, the group of suspicious entities which may be malicious 299 can be reduced. Furthermore, this step provides a filter system of determining which suspicious entities are in common with different records of suspicious entities.

At step 930, the method 900 comprises the server processing system 730 analysing the one or more common suspicious entities to determine one or more malicious entities 299. The server processing system can comprise a malicious assessment module configured to determine whether one or more of the common related entities are malicious 299.

The malicious analysis module can comprise a set of malicious assessment rules to determine a level of maliciousness of the common suspicious entities. The level of maliciousness can then be compared to a maliciousness limit, and in the event of a successful comparison, at least some of the common suspicious related entities are identified as malicious 299.

In one form, if a common suspicious entity satisfies a particular malicious assessment rule, the common suspicious entity is associated with a value or weight indicating how malicious the entity is considered. If the same common suspicious entity satisfies a number of particular malicious assessment rules, the values or weights associated with the entity are totalled. The total value or weight can be compared to a maximum limit to determine whether the common suspicious related entity is a malicious entity.

The malicious assessment rules are generally considered to be a stricter set of rules comparatively to the related entity rules used at the client processing system 710. The related entity rules can be used as a first filter. The determination of common suspicious related entities can then be used as a second filter. The malicious assessment rules can then be used as a third filter to determine a malicious entity at one of the client processing systems.

As the malicious assessment rules are generally more complex and considered more complete comparative to the related entity rules, a number of the suspicious entities may not satisfy the malicious assessment rules and are therefore not identified as malicious. For example, a legitimate printer driver may have been identified as a common suspicious entity due to a particular malicious entity using the printer driver to perform malicious activities using the one of the client processing systems 710. However, after the malicious assessment rules are applied, the printer driver is determined to not be malicious. The remaining common suspicious entities which satisfy the malicious assessment rules are identified as being malicious to the one or more client processing systems 710.

At step 940, the method 900 comprises the server processing system 720 recording in a database the one or more malicious entities 299 identified in step 930. This process is particularly useful for early detection of new or modified malicious software, so that instructions can be generated as early as possible to restrict malicious activity being performed in the future by the identified malicious entity or entities 299 in the client processing systems 710.

Optionally, at step 950, the method 900 comprises transferring, from the server processing system 720 to one or more of the plurality of client processing systems 710, instructions to restrict malicious activity being performed by the one or more malicious entities 299. The instructions may be computer executable instructions which can be transferred from the server processing system 720 to the one or more client processing systems 710 which can be executed to quarantine the one or more malicious entities. In one form, this may comprise quarantining the one or more malicious entities 299. In one embodiment, quarantining the one or more malicious entities 299 may comprise removing the one or more malicious entities 299 from the one or more client processing systems 710. In another embodiment, quarantining the one or more malicious entities 299 may comprise modifying the one or more malicious entities 299 in the one or more client processing systems 710.

Figure 10:
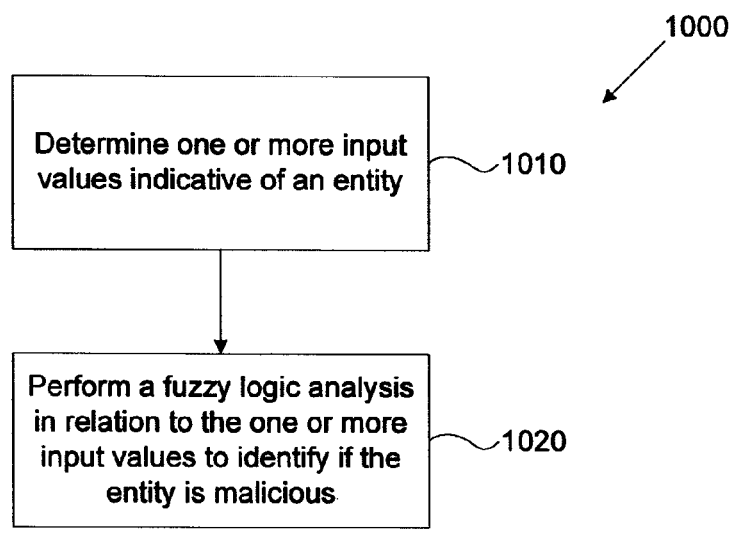
FIG. 10 illustrates a flow diagram representing an example method of identifying a malicious entity using fuzzy logic analysis.

Referring now to FIG. 10 there is shown a flow diagram illustrating a method of identifying a malicious entity 299 in a processing system 100.

In particular, the method 1000 comprises at step 1010 determining one or more input values 1110 indicative of an entity 500. At step 1020 the method 1000 comprises performing a fuzzy logic analysis using the one or more input values 1110 to identify if the entity 500 is malicious 299.

Figure 11:
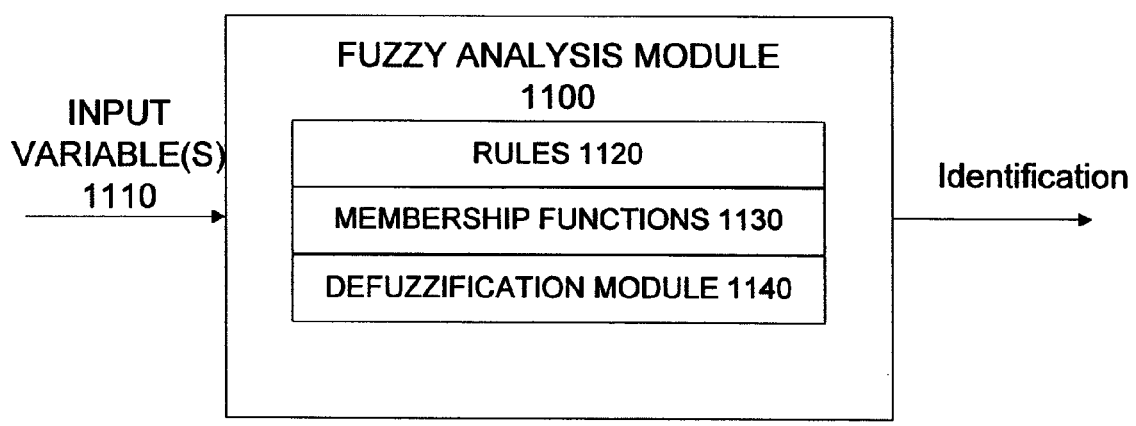
FIG. 11 illustrates a block diagram representing an example of a fuzzy logic module to perform fuzzy logic analysis.

Referring to FIG. 11 there is shown a block diagram illustrating a fuzzy logic module 1100 to perform the fuzzy logic analysis.

In particular, the fuzzy logic module 1100 comprises a set of logic rules 1120, and a number of membership functions 1130. The fuzzy logic module 1100 receives at least one input value 1110 indicative of the entity. The at least one input value can comprise at least one of: an entity threat value; a group threat value; a frequency of an event occurring; a number of related entities to the entity; and a number of child processes created by the entity. However, it will be appreciated that other input values of the entity can be used to determine whether the entity is malicious.

The fuzzy logic module 1100 is configured to use the at least one input value 1110, the one or more membership functions 1130 and the set of logic rules 1120 to determine an output value. The fuzzy logic module 1100 comprises a defuzzification module 1140 configured to perform a defuzzification process to identify if the entity 500 is malicious 299.

In additional or alternative forms, the method and system can be adapted to determine a response to the identification as to whether an entity is malicious. For example, possible responses in relation to the entity may comprise: allow the entity to continue functioning in the processing system 100; report the entity to the user of the processing system 100 and optionally the output value; and restrict the entity in the processing system 100.

It will be appreciated that in a networked system, the fuzzy logic module can be located at the client processing system 710, or at the server processing system 720.

An example of a fuzzy logic analysis to identify a malicious entity is shown in FIGS. 12A, 12B 12C, 12D and 12E.

In particular, the input variables are: the number of instances the entity has invoked the processing system 100 to download data from a remote network address in the past twenty four hours 1204; and the number of related entities in relation to the entity 1214. The output is one of the following responses: allow the entity to function in processing system 100 (allow 1221); prompt the user of the processing system 100 about the entity (prompt 1222); and restrict the entity from functioning in the processing system 100 (restrict 1223).

In this example for FIGS. 12A, 12B, 12C, 12D and 12E the frequency 1204 is equal to five instances in the past twenty four hours and the number of related entities 1214 is equal to nine.

Figure 12A:
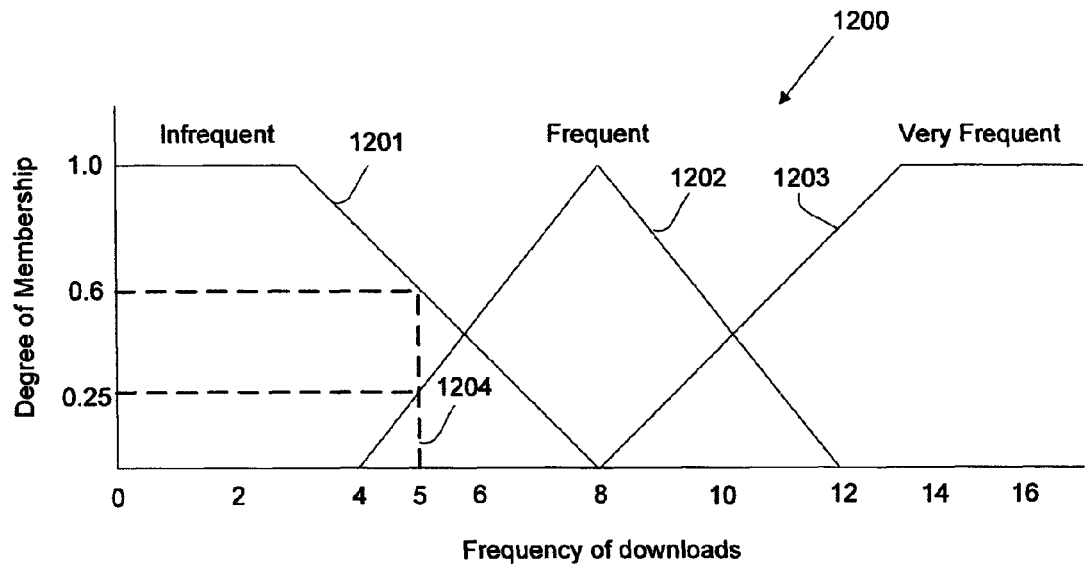
FIGS. 12A to 12E illustrate a block diagram of an example using the fuzzy logic module.
Figure 12B:
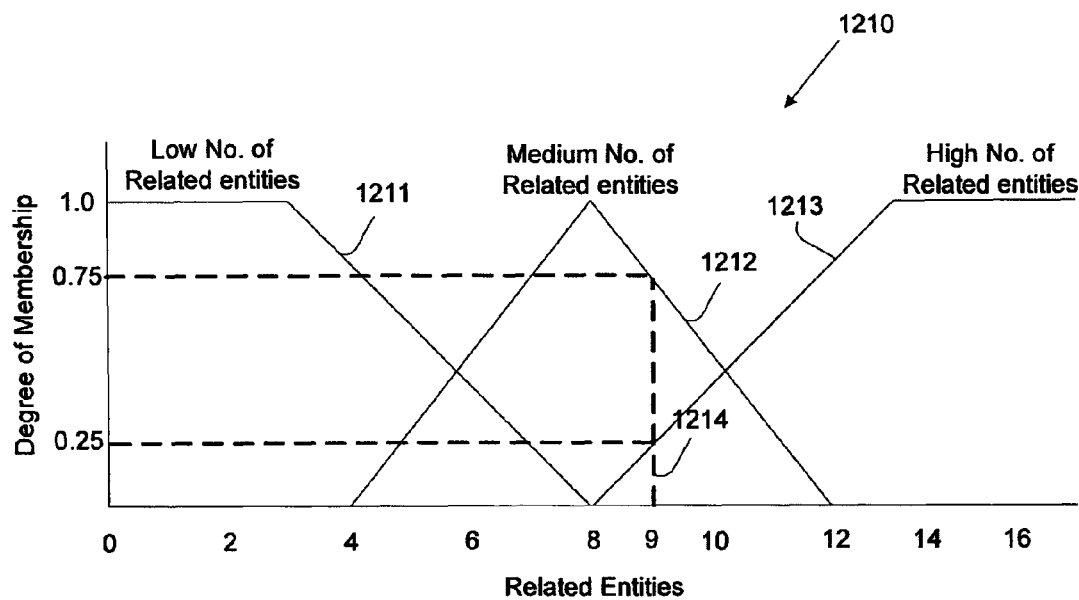

FIGS. 12A and 12B illustrate membership functions 1200, 1210 for the frequency and the number of related entities respectively. The ranges for the membership function 1200 comprise infrequent 1201, frequent 1202, and very frequent 1203. The ranges for the membership function 1210 comprise low number of related entities 1211, medium number of related entities 1212, and high number of related entities 1213. The input values of the frequency of downloads and the number of related entities have been mapped on the horizontal axes of the membership functions comprising intersecting points and corresponding degrees of membership on the vertical axes.

Figure 12C:
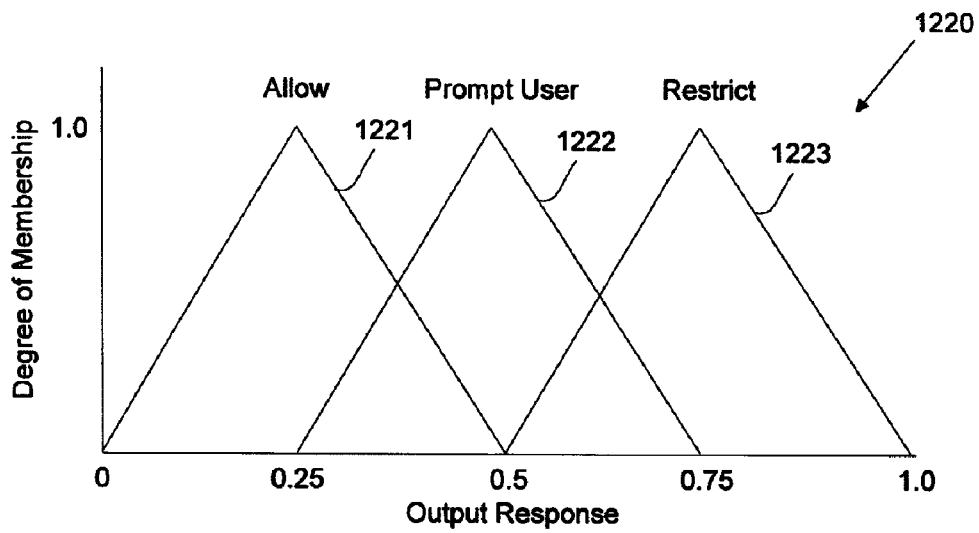

FIG. 12C illustrates an output membership function 1220 which comprises: allowing the entity to function (allow 1221), prompting the user regarding the entity (prompt 1222), and restricting the entity (restrict 1223). It will be appreciated that other forms of output membership functions could be used such as malicious or non-malicious. It will also be appreciated that different shaped membership functions can be used other than those illustrated.

Figure 12D:
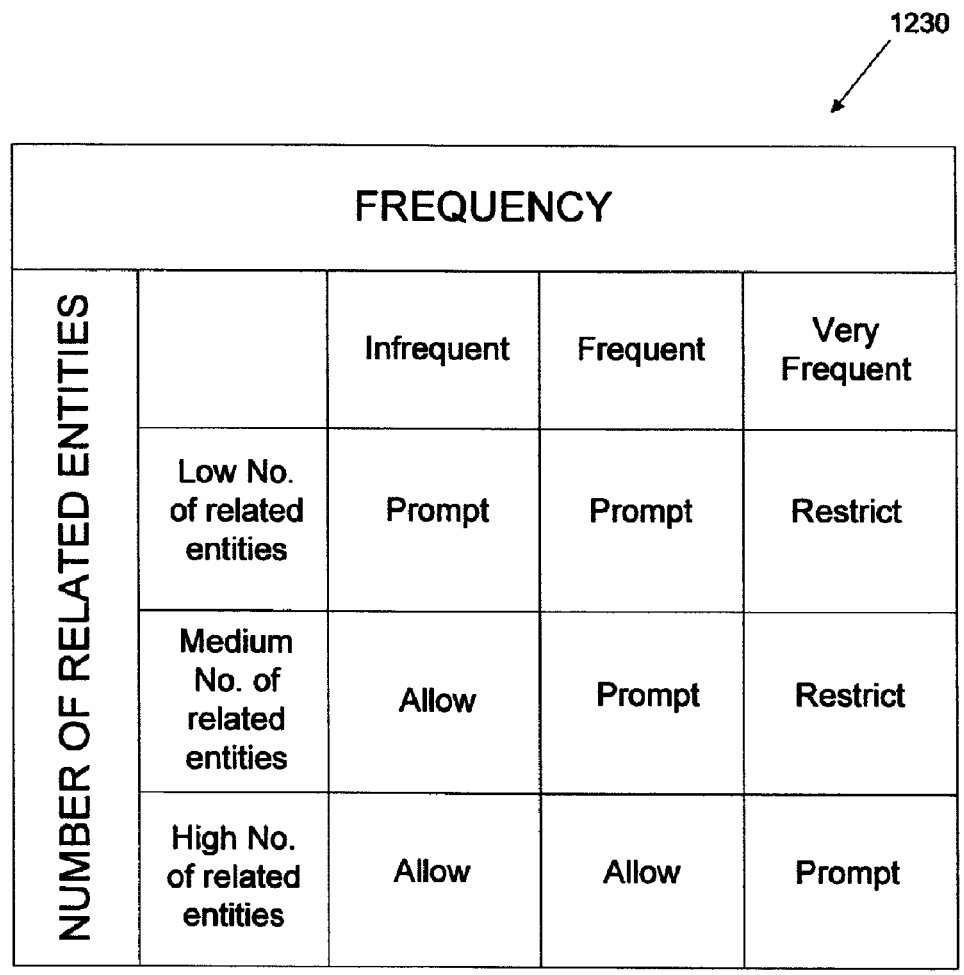
Figure 12E:
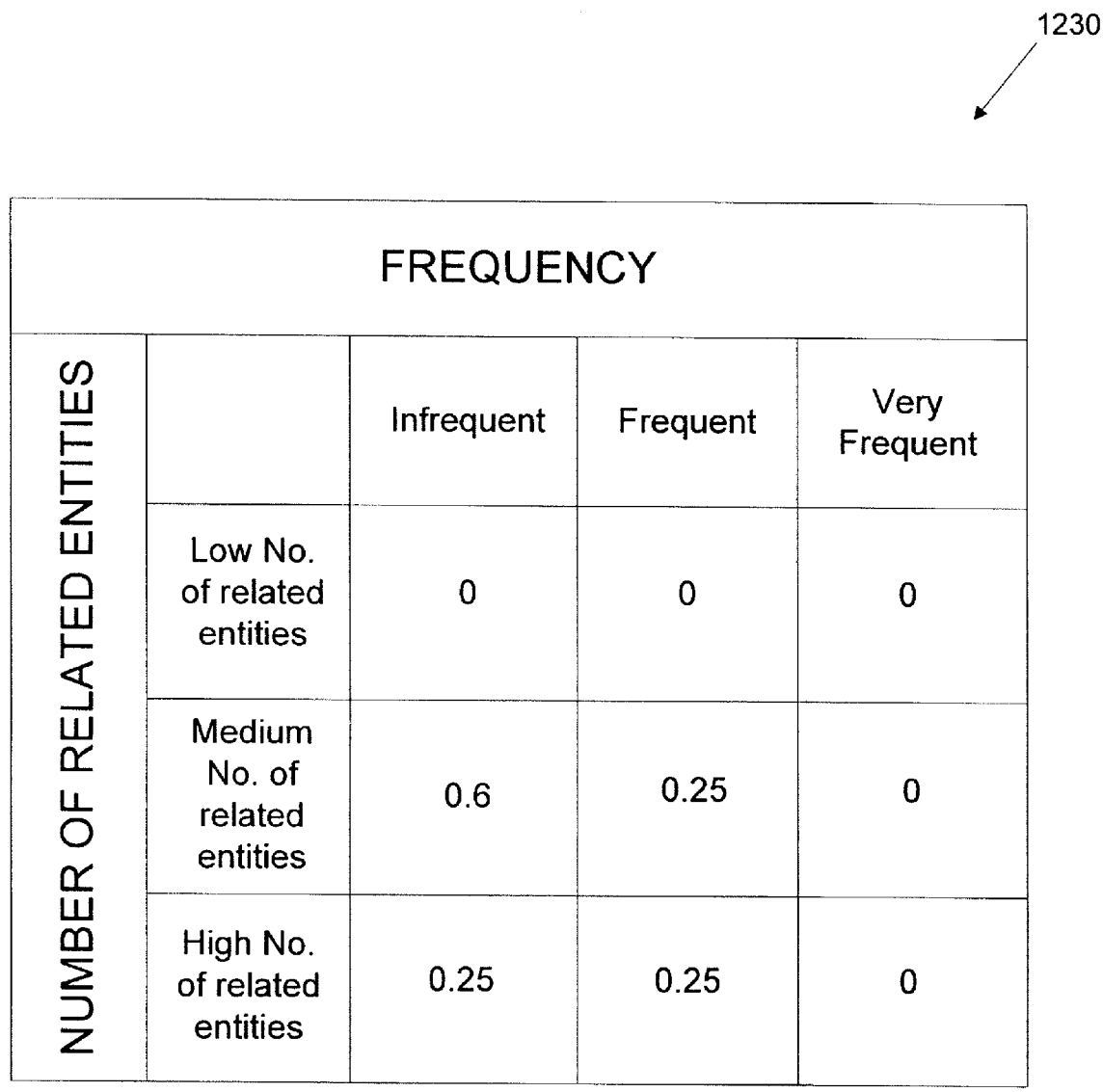

FIG. 12D illustrates a rule matrix 1230 for the respective input values and the associated output results (allow; prompt; restrict) for the specific input values. As illustrated in FIG. 12E, the degree of membership for each input variable has been input into the rule matrix 1230. As will be appreciated by people skilled in the relevant art, a minimum function (logical product) has been applied to the degrees of membership for each combination of input variables to determine a set of fuzzy output response magnitudes. It will be appreciated that other logical operations can be applied, such as logical sum (ie OR).

The fuzzy logic magnitudes are then used in a defuzzification process. In this example a maximum method is used, where the output with the highest fuzzy output response magnitude is selected. In this instance, the "allow" output membership function has a the highest fuzzy output response magnitude equalling '0.6'. In this instance the output is to allow the entity to continue functioning in the processing system 100. It will be appreciated that other methodologies can be used in the defuzzification process such as a centroid method as well as other known methods for performing the defuzzificaton process.

Optionally, the one or more client processing systems 710 may receive one or more updated formulas. The updated formulas can comprise one or more updated CTV formulas 265, ETV formulas 285, RETV formulas 575 and GTV formulas 590. Each client processing system 710 can then update the respective formulas.

In another optional form, the one or more client processing systems 710 may receive one or more updated thresholds. The updated thresholds can comprise one or more updated ETT 290, RETT 227 and GTT 229. Each client processing system 710 can then update the respective thresholds.

Optionally, the one or more client processing systems 710 may receive, one or more updated related entity rules and/or one or more updated starting entity rules.

In another optional form, updated fuzzy logic rules 1120 and membership functions 1130 can be received by the client processing system 710 from the server processing system 720. The client processing system 710 can then update the existing rule and functions with the received rules and functions.

The one or more client processing systems 710 may receive updates from the server processing system 720 via a network connection, a data transfer mechanism (such as e-mail) or via a data store such as a compact disk or the like.

In one optional form, the suspicious related entities may be used as a form of feedback to adjust the thresholds used by the one or more client processing system 710. For example, if the server processing system 720 determines that ninety percent of suspicious entities are not being determined to be malicious 299, then one or more thresholds may be adjusted so that an optimum level of filtering is obtained. In one form, this optimum level of filtering may be obtained using a fuzzy logic system which determines whether one or more of the thresholds need to be increased or decreased.

In one form, statistical processes, fuzzy logic processes and/or heuristical processes can be used in combination with the related entity rules, the starting entity rules, and/or the malicious assessment rules to determine whether a rule has been satisfied.

The embodiments illustrated may be implemented as a software package or component. Such software can then be used to pro-actively seek to determine one or more malicious entities. Various embodiments can be implemented for use with the Microsoft Windows operating system or any other modern operating system.

It will be appreciated that although in some of the above examples the server processing system 720 generates the instructions to quarantine the malicious entities 299, the one or more client processing systems 710 may alternatively generate the instructions.

Other processes may be used, separately or in combination with the malicious assessment rules, to determine which part of the group is malicious. For example, the method may comprise using a white-list to divide the group into the one or more sub-groups. For example, a group of related entities 560 may comprise operating system files, and non-operating system files. The method may therefore comprise, using a white-list to separate the group of related entities 560 into a cluster of operating system files and a cluster of non-operating system files. Based on this separation, it may be determined that the non-operating system files are malicious 299.

It is noted that an entity which is suspicious is not always identified as being malicious (ie. an entity which is identified as being suspicious is only suspected as being a malicious entity).

The related entity rules to determine the one or more suspicious related entities are generally less complex (such as a reduced number of rules) compared to the malicious assessment rules in order to reduce the processing performed by the client processing systems 710. The malicious assessment rules can be used by a server processing system 720 to determine which suspicious entities are malicious 299. By using this configuration, the server 720 preferably performs the processing related to determining the malicious entities 299, and thus the client processing systems 710 can utilise processing system resources more effectively.

In optional forms, a mode of operation of an entity 500 may be used to weight the ETV or the GTV. For example, an entity 500 may be operating in an administrative mode when it was recorded connecting to a remote network address. The entity is therefore considered a high threat and therefore the ETV for the entity is weighted accordingly to indicate this high risk threat.

In other optional forms, the method of installation for an entity, or installation files associated with an entity, can be analysed to determine one or more characteristic of an entity to allow the identification of a malicious entity. Such analysis may comprise: determining whether an installation files was automatically executed without user input; the installation file is designed to delete itself after execution; the installation file is not an executable file; the installation file does not create a new sub-directory in the processing system 100; the installation file does not install itself in add and remove wizards for the operating system; the installation file use hidden or deceptive methods to install the entity, such as using run keys; the installation file is configured to install the entity in a directory which comprises a large number of other entities; the installation file was not initially downloaded using an Internet browser; the installation file does not download ongoing updates using an Internet browser and/or requesting user input; and the installation file uses social engineering to install the entity (ie SCVHOST.exe instead of SVCHOST.exe).

Other characteristics 250 that can be determined regarding an entity 500 can comprise: where the entity 500 was downloaded from (ie which country); run-key changes performed by the entity 500; contents of the entity 500; whether the entity 500 creates auto-startup points; the type of packer/compression means used in relation to the entity. Associated CTV formulas can be used to calculate an appropriate CTV indicative of the severity of the threat which the characteristic represents to the processing system 100. For example, if the entity 500 was downloaded from the US, a small CTV may be calculated which contrasts to an entity which was downloaded from Russia which may result in a large CTV being calculated due to entities being downloaded from Russia being considered to represent a more severe threat to the processing system 100.

The embodiments described throughout can be implemented via hardware, software or a combination of both.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The claims defining the invention are as follows:

1. A method of identifying a malicious entity in a processing system, wherein the method comprises:
    determining, by a processor, an entity threat value for an entity, the entity threat value being indicative of a level of threat that the entity represents to the processing system, wherein the entity threat value is determined based on one or more characteristics of the entity; and
    comparing, by a processor, the entity threat value to an entity threat threshold to identify if the entity is malicious.

2. The method according to claim 1, wherein each of the one or more characteristics of the entity is associated with a respective characteristic threat value, wherein the method comprises calculating the entity threat value using at least some of the characteristic threat values for the one or more characteristics of the entity.

3. The method according to claim 2, wherein at least one of the one or more characteristics of the entity is associated with a characteristic threat value formula, wherein the method comprises calculating, using the characteristic threat value formula, the characteristic threat value.

4. The method according to claim 3, wherein at least one characteristic threat value is temporally dependent, wherein the method comprises calculating the at least one characteristic threat value for the entity using the characteristic threat value formula and a temporal value.

5. The method according to claim 3, wherein the at least one characteristic is a behaviour associated with the entity, wherein the method comprises calculating the at least one characteristic threat value for the entity using the characteristic threat value formula and a frequency of instances the behaviour has been performed.

6. The method according to claim 2, wherein the one or more characteristics comprises at least one of one or more legitimate characteristics indicative of non-malicious activity and one or more illegitimate characteristics indicative of malicious activity, wherein the method comprises determining the entity threat value using characteristic threat values associated with the one or more legitimate characteristics and the one or more illegitimate characteristics of the entity.

7. The method according to claim 6, wherein the step of determining the entity threat value for an entity comprises calculating a difference between the characteristic threat values for the one or more legitimate characteristics of the entity, and the characteristic threat values for the one or more illegitimate characteristics of the entity, wherein the difference is indicative of the entity threat value.

8. The method according to claim 1, wherein the method comprises:
    determining one or more related entities to the entity, wherein each related entity has an associated entity threat value; and,
    calculating the entity threat value for the entity using the entity threat value for at least some of the one or more related entities.

9. The method according to claim 8, wherein the method comprises:
    determining one or more related entities to the entity, wherein each related entity has an associated entity threat value; and,
    calculating a group threat value for the entity and one or more related entities using the entity threat value for at least some of the one or more related entities and the entity.

10. The method according to claim 8, wherein the method comprises weighting the entity threat value for at least one related entity according to a relatedness of the at least one related entity relative to the entity.

11. The method according to claim 1, wherein the method comprises weighting the entity threat value for the entity according to permissions of the entity.

12. A system to identify a malicious entity in a processing system, wherein the system comprises:
    a processor;
    memory in electronic communication with the processor;
    the processor configured to:
        determine an entity threat value for an entity, the entity threat value being indicative of a level of threat that the entity represents to the processing system, wherein the entity threat value is determined based on one or more characteristics of the entity; and
        compare the entity threat value to an entity threat threshold to identify if the entity is malicious.

13. A computer program product comprising a non-transitory computer readable medium having a computer program recorded therein or thereon, the computer program enabling identification of a malicious entity in a processing system, wherein the computer program product configures the processing system to:
    determine an entity threat value for an entity, the entity threat value being indicative of a level of threat that the entity represents to the processing system, wherein the entity threat value is determined based on one or more characteristics of the entity; and
    compare the entity threat value to an entity threat threshold to identify if the entity is malicious.

14. A method for identifying a malicious entity in a processing system, wherein the method comprises:

determining, by a processor, one or more input values indicative of an entity; and performing, by a processor, a fuzzy logic analysis in relation to the one or more input values to identify if the entity is malicious.

15. The method according to claim 14, wherein the method comprises determining an action to perform in regard to whether the entity is determined to be malicious.

16. The method according to claim 14, wherein the one or more input values can comprise at least one of:
   an entity threat value;
   a group threat value;
   a frequency of an event occurring;
   a number of related entities to the entity; and
   a number of child processes created by the entity.

17. A system to identify a malicious entity in a processing system, wherein the system
   a processor;
   memory in electronic communication with the processor;
   the processor configured to:
   determine one or more input values indicative of one or more characteristics of an entity; and
   perform a fuzzy logic analysis in relation to the one or more input values to identify if the entity is malicious.

18. A system according to claim 17, wherein the system is configured to determine an action to perform in regard to whether the entity is determined to be malicious.

19. The system according to claim 17, wherein the one or more input values can comprise at least one of:
   an entity threat value;
   a group threat value;
   a frequency of an event occurring;
   a number of related entities to the entity; and
   a number of child processes created by the entity.

20. A computer program product comprising a non-transitory computer readable medium having a computer program recorded therein or thereon, the computer program enabling identification of a malicious entity in a processing system, wherein the computer program product configures the processing system to:
   determine one or more input values indicative of one or more characteristics of an entity; and
   perform a fuzzy logic analysis in relation to the one or more input values to identify if the entity is malicious.

* * * * *